(12) United States Patent
Park

(10) Patent No.: US 11,484,820 B2
(45) Date of Patent: Nov. 1, 2022

(54) FOLDABLE OIL FILTER UNIT

(71) Applicant: Eun Soon Park, Ansan-si (KR)

(72) Inventor: Eun Soon Park, Ansan-si (KR)

( * ) Notice: Subject to any disclaimer, the term of this patent is extended or adjusted under 35 U.S.C. 154(b) by 59 days.

(21) Appl. No.: 17/199,503

(22) Filed: Mar. 12, 2021

(65) Prior Publication Data

US 2021/0283538 A1    Sep. 16, 2021

(30) Foreign Application Priority Data

Mar. 12, 2020   (KR) ........................ 10-2020-0030826

(51) Int. Cl.
| | | |
|---|---|---|
| *B01D 35/16* | (2006.01) | |
| *B01D 29/11* | (2006.01) | |
| *B01D 35/30* | (2006.01) | |
| *F01M 11/03* | (2006.01) | |

(52) U.S. Cl.
CPC .............. *B01D 35/16* (2013.01); *B01D 29/11* (2013.01); *B01D 35/30* (2013.01); *F01M 11/03* (2013.01)

(58) Field of Classification Search
CPC ........ B01D 35/16; B01D 29/11; B01D 35/30; B01D 29/21; B01D 35/153; B01D 35/005; F01M 11/03; F01M 2011/0416; F01M 11/0408
See application file for complete search history.

(56) References Cited

U.S. PATENT DOCUMENTS

2017/0066114 A1    3/2017   Tofte

FOREIGN PATENT DOCUMENTS

| EP | 1321637 A1 | 6/2003 |
|---|---|---|
| KR | 20-0199680 Y1 | 10/2000 |
| KR | 101691556 B1 * | 11/2015 |
| KR | 10-1583713 B1 | 1/2016 |
| KR | 10-1691556 B1 | 1/2017 |
| KR | 10-1698693 B1 | 1/2017 |

* cited by examiner

*Primary Examiner* — Waqaas Ali

(74) *Attorney, Agent, or Firm* — KORUS Patent, LLC; Seong Il Jeong

(57) ABSTRACT

The present invention provides a foldable oil filter unit that a drain pin thereof can be easily separated. The foldable oil filter includes a cap receiving a filter; a drain pin disposed on a bottom side of the filter; and a capturing part disposed on a bottom side of the filter and detachably, rotatably capturing the drain pin.

15 Claims, 21 Drawing Sheets

1

FOLDABLE OIL FILTER UNIT

FIELD OF THE INVENTION

The present invention relates to an oil filter unit and more particularly, to an oil filter unit that enables a drain pin to be easily separated.

BACKGROUND OF THE INVENTION

In general, oil is supplied to friction parts inside the engine, and performs as smooth lubrication and cooling of the friction parts, when the engine is driven. This oil may be contaminated by foreign substances such as metal particles, carbon particles, and oxides which is generated when oil is oxidized as a driving time increases. If the contaminated engine is driven, the friction in rotational parts will be worn away and be damaged. As the wear and damages deteriorate, it causes the friction parts to be fused, which may lead to the risk of accidents.

Accordingly, it is significantly important to maintain oil in a clean condition, which is directly relevant to the engine lifetime and performance. An oil filter unit has to be installed on an oil circulation system so that oil can be maintained in a clean condition.

The oil filter unit will be explained referring to FIG. 1.

An oil filter unit 1 comprises: a case CA, a filter F that is replaceably installed inside the cases CA; and a cap CP that is detachably coupled to an opened lateral side of the case CA. A drain nipple N that a drain pin P is inserted into is formed in the cap CP. Thus, the drain pin P penetrates the drain nipple N, enters the inside of the cap CP, and is placed in the filter F.

In case of the oil filter unit 1 above, since a slide block P1 of the drain pin P is stuck in the filter F, the drain pin P is needed to revolve, which makes the slide block P1 separated, in order to separate the drain pin P from the filter F. This is a time-consuming and complicated process.

In addition, in case of the oil filter unit 1 above, since the drain pin P is arranged in a vertical direction, it interferes the vertical loading of a plurality of the oil filter units 1, which leads to an increase of load volume.

Furthermore, when an operator separates the drain pin P by moving it downward, which may cause an oil leakage, the oil leaked from this process may contaminate a hand of the operator because a hand of the operator is positioned under the drain pin P.

Meanwhile, since the oil filter module itself is widely known and described in detail in the prior arts such as Korean Patent No. 10-1691556 and Korean Patent No. 10-1583713, the explanation and description will be omitted.

In order to resolve the problems above, the present invention provides an oil filter unit that a drain pin is easily separated and that reduces the load volumes when loading multiple oil filter units.

The purposes of the present invention are not limited to the mentioned above. Additional purposes of the inventive concept will be set forth in the description below which will become apparent to those having ordinary skill in the art.

According to the oil filter unit of the present invention, a drain pin which can be easily separated can improve the work efficiency. In addition, since a plurality of the oil filter units can be tightly arranged without space, the load volumes of multiple oil filter units can be reduced.

SUMMARY OF THE INVENTION

The present invention provides an oil filter unit comprising: a cap CP receiving a filter F; a drain pin 100 disposed on a bottom side of the filter F; and a capturing part 200 disposed on a bottom side of the filter F and detachably, rotatably capturing the drain pin 100; wherein the capturing part 200 includes a rotational capturing part 210 that rotatably captures the drain pin 100 by a female and a male coupling; wherein the rotational capturing part 210 includes a pair of second brackets 211 that protrudes in a vertical direction from the bottom side of the filter F and that are spaced apart from each other and protruding parts 212 that respectively protrude, with a curvature, at inner lateral sides of the second brackets 211 that face each other; wherein the connecting part 120 includes a pair of first brackets 121 that each has a plate shape and grooved parts 122 that are formed, with a curvature, at outer lateral sides of the first brackets 121, that do not face each other, wherein the protruding parts 212 are inserted into the grooved parts 122, respectively.

The drain pin 100 comprises a drain pin body 110 and a second through-hole 140 formed in the drain pin body 110, wherein a portion of the second though-hole 140 is exposed from a drain nipple N, and an inserting pin 300 is inserted into the second through-hole 140 from outside, wherein the inserting pin 300 has a bar shape, and a diameter of the inserting pin 300 becomes reduced as it comes closer to the drain pin 100, wherein when the inserting pin 300 is inserted to the second through-hole 140, the drain pin 100 moves downward and is separated.

The drain pin body 110 further comprises a first body 111 that the connecting part 120 is formed in; a second body 112 that the first body 111 is rotatably connected to; and a cross roller bearing CR that is disposed between the first body 111 and the second body 112; wherein the first body 111 comprises a first stem 111-1 that the connecting part 120 is formed in and that has a bar shape and a ledge 111-2 that is formed under the first stem 111-1 and a diameter thereof is bigger than that of the first stem 111-1, wherein the second body 112 comprises a second stem 112-1 that has a bar shape, a though-hole 112-3 that is formed at a top side of the second stem 112-1, and a receiving part 112-2 that is formed under the through-hole 112-3 and that receives the ledge 111-2.

The cross roller bearing CR is disposed between the first stem 111-1 and the through-hole 112-3, and the cross roller bearing CR comprises a retainer 400 that is disposed between a plurality of rollers CR1, the retainer 400 comprises a first retainer body 410 and a second retainer body 410 that each has a plate shape, wherein a through-hole TH, a first center inflow hole 413, and a first lateral inflow hole 414 are formed at an outer lateral side of the first retainer body 410 that is an opposite side to the second retainer body 420, wherein the first center inflow hole 413 and the first lateral inflow hole 414 are formed under the through-hole TH, wherein the first center inflow hole 413 is formed in a bottom center in a width direction, wherein the first lateral inflow hole 414 is plural, and a plurality of first lateral inflow holes 414 are formed at both sides of the first center inflow hole 413 in a width direction, wherein a first top receiving groove 411 and a first bottom receiving groove 412 are formed at an inner lateral side of the first retainer body 410, that faces the second retainer body 420, wherein each of the first top receiving groove 411 and the first bottom receiving groove 412 is extended in a thickness direction, wherein the first top receiving groove 411 and the first bottom receiving groove 412 are spaced apart in a height direction, wherein a first center communicating hole 413-1 is formed under the first bottom receiving groove 412, and communicated with the first center inflow hole 413, wherein a first lateral communicating hole 414-1 is formed at both sides of the first center communicating hole 413-1 in a width direction, and communicated with the first lateral inflow hole 414, wherein a flow path FL is formed between the first center communicating hole 413-1 and the first bottom receiving groove 412; between the first lateral communicating hole 414-1 and the first bottom receiving groove 412.

A first center storing groove 415-1 is formed above the first top receiving groove 411, wherein a first lateral storing groove 416-1 is formed at both sides of the first top receiving groove 411 in a width direction, wherein a third storing groove 417 is formed between the first top receiving groove 411 and the first bottom receiving groove 412, wherein a flow path FL is formed between the first center storing groove 415-1 and the first top receiving groove 411; between the first lateral storing groove 416-1 and the first top receiving groove 411; and between the third storing groove 417 and the first lateral storing groove 416-1.

A through-hole TH, a second center inflow hole 423, and a second lateral inflow hole 424 are formed at an outer lateral side of the second retainer body 420 that is an opposite side to the first retainer body 410, wherein the second center inflow hole 423 and the second lateral inflow hole 424 are formed above the through-hole TH, wherein the second center inflow hole 423 is formed in a top center in a width direction, wherein the second lateral inflow hole 424 is plural, and a plurality of second lateral inflow holes 424 are formed at both sides of the second center inflow hole 423 in a width direction, wherein a second top receiving groove 421 and a second bottom receiving groove 422 are formed at an inner lateral side of the second retainer body 420 that faces the first retainer body 410, wherein each of the second top receiving groove 421 and the second bottom receiving groove 422 is extended in a thickness direction, and the second top receiving groove 421 and the second bottom receiving groove 422 are spaced apart in a height direction, wherein a second center communicating hole 423-1 is formed above the second top receiving groove 422, and communicated with the second center inflow hole 423, wherein a second lateral communicating hole 424-1 is formed at both sides of the second center communicating hole 423-1 in a width direction, and communicated with the second lateral inflow hole 424, wherein a flow path FL is formed between the second center communicating hole 423-1 and the second top receiving groove 421; between the second lateral communicating hole 424-1 and the second top receiving groove 422.

A third communicating hole 427 is formed above the second bottom receiving groove 422, wherein a second lateral storing groove 426-1 is formed at both sides of the second bottom receiving groove 422 in a width direction, wherein a second center storing groove 425-1 is formed under the second bottom receiving groove 426-1, wherein a flow path FL is formed between the second center storing groove 425-1 and the second bottom receiving groove 422; between the second lateral storing grove 426-1 and the second bottom receiving groove 422; and between the third storing groove 427 and the second bottom receiving groove 422.

Grease flows through the through-hole TH of the first retainer body 410 and the through-hole TH of the second retainer body 420, wherein after the grease enters through the first center inflow hole 413 and the first lateral inflow hole 414 of the first retainer body 410, the grease flows the first center communicating hole 413-1 and the first lateral communicating hole 414-1; some of the grease flows into the first bottom receiving groove 412 through the flow path FL; and the rest of the grease flows into the second center storing groove 425-1 and the second lateral storing groove 426-1 of the second retainer body 420, and then flows into the second bottom receiving groove 422 through the flow path FL, wherein after the grease enters through the second center inflow hole 423 and the second lateral inflow hole 424 of the second retainer body 420, some of the grease flows the second center communicating hole 423-1 and the second lateral communicating hole 424-1; some of the grease flows into the second top receiving groove 421 through the flow path FL; and the rest of the grease flows into the first center storing groove 415-1 and the first lateral storing groove 416-1 of the first retainer body 410, and then flows into the first top receiving groove 411 through the flow path FL, wherein after the grease enter through the third inflow hole 425 of the second retainer body 420, some of the grease that is flowed into the third inflow hole 425, flows into the second top receiving groove 421 and the second bottom receiving groove 422 through the third communicating hole 427; the rest of the grease that is flowed into the third inflow hole 425, flows into the third storing groove 417 of the first retainer body 410, and then the grease in the third storing groove 417 flows into the first top receiving groove 411 and the first bottom receiving groove 412 through the flow path FL.

The foldable oil filter unit further comprises a buffering part 500 disposed between the first retainer body 410 and the second retainer body 420, wherein the buffering part 500 is disposed in the first top receiving groove 411, the first bottom receiving groove 412, the second top receiving groove 421, and the second bottom receiving groove 422, respectively, wherein the buffering part 500 comprises an elastic storing part 510 that is elastically deformed by an inflow of grease, a supporting ring 520 that receives the elastic storing part 510 inside, and a foldable elastic part 530 that provides elastic force to the elastic storing part 510, wherein the elastic storing part 510 comprises an elastic storing part body 511 that is made of elastic materials and that has a hollow shape, and an entering hole 512 that is formed at a side of the elastic storing part body 511 and grease flows through.

The supporting ring 520 comprises a first supporting ring 521 and a second supporting ring 522 that are spaced apart from each other, wherein a connecting frame 523 having a bar shape, is disposed between the first and the second supporting ring 521, 522, wherein a plurality of connecting frames 523 are spaced apart from each other and formed along circumferences of the first and the second supporting ring 521, 522, wherein the foldable elastic part 530 is formed as a wave shape and disposed in a space between the connecting frames 523 along a circumferential direction of the supporting ring 521.

A portion of the foldable elastic part 530 along the circumferential direction is opened, wherein when the elastic storing part 510 is expanded, the elastic storing part 510 meets the foldable elastic part 530, and thereby, the foldable elastic part 530 is unfolded; wherein an elastic force of the foldable elastic part 530 pressurizes the elastic storing part 510 to return its original shape.

The foldable oil filter unit according to claim 11, the foldable oil filter unit further comprises a connecting part 540 disposed between the elastic storing parts 510, wherein the connecting part 540 comprises an elastic part 541 that has a ring shape and covers 542 that are disposed at both sides of the elastic part 541 and that are respectively fixed to the elastic storing part 510, wherein the elastic part 541 comprises an elastic circular arc part 5411 that has a circular arc shape in a cross section and an extending part 5412 that is extended from both sides of the elastic circular arc part 5411 in a horizontal direction, wherein the covers 542 comprises a first cover 542A that is disposed at one side of the elastic part 541 and a second cover 542B that is disposed at the other side of the elastic part 541 and has a symmetrical shape to the first cover 542A, wherein the cover 542 has a hollow shape and is disposed inside the extending part 5412, wherein the cover 542 comprises a cover body 5421 that is opened toward the elastic part 541 and an interlocking bump 5422 that protrudes from the cover body 5421.

A first opening part 5413 is formed along a circumferential direction in the extending part 5412 that is disposed at one side of the elastic part 541, and the interlocking bump 5422 is inserted into the first opening part 5413, wherein a second opening part 5414 is formed along a circumferential direction in the extending part 5412 that is disposed at the other side of the elastic part 541, and the interlocking bump 5422 is inserted into the second opening part 5414.

The capturing part 200 includes a paper 220 that is connected to the bottom side of the filter F by ultrasonic welding, wherein the drain pin 100 is connected to the paper 220.

The capturing part 200 includes an adhesive 230 that is connected to the bottom side of the filter F by ultrasonic welding, wherein the drain pin 100 is connected to the adhesive 230.

DETAILED DESCRIPTION EMBODIMENTS OF THE INVENTIONS

Figure 1:
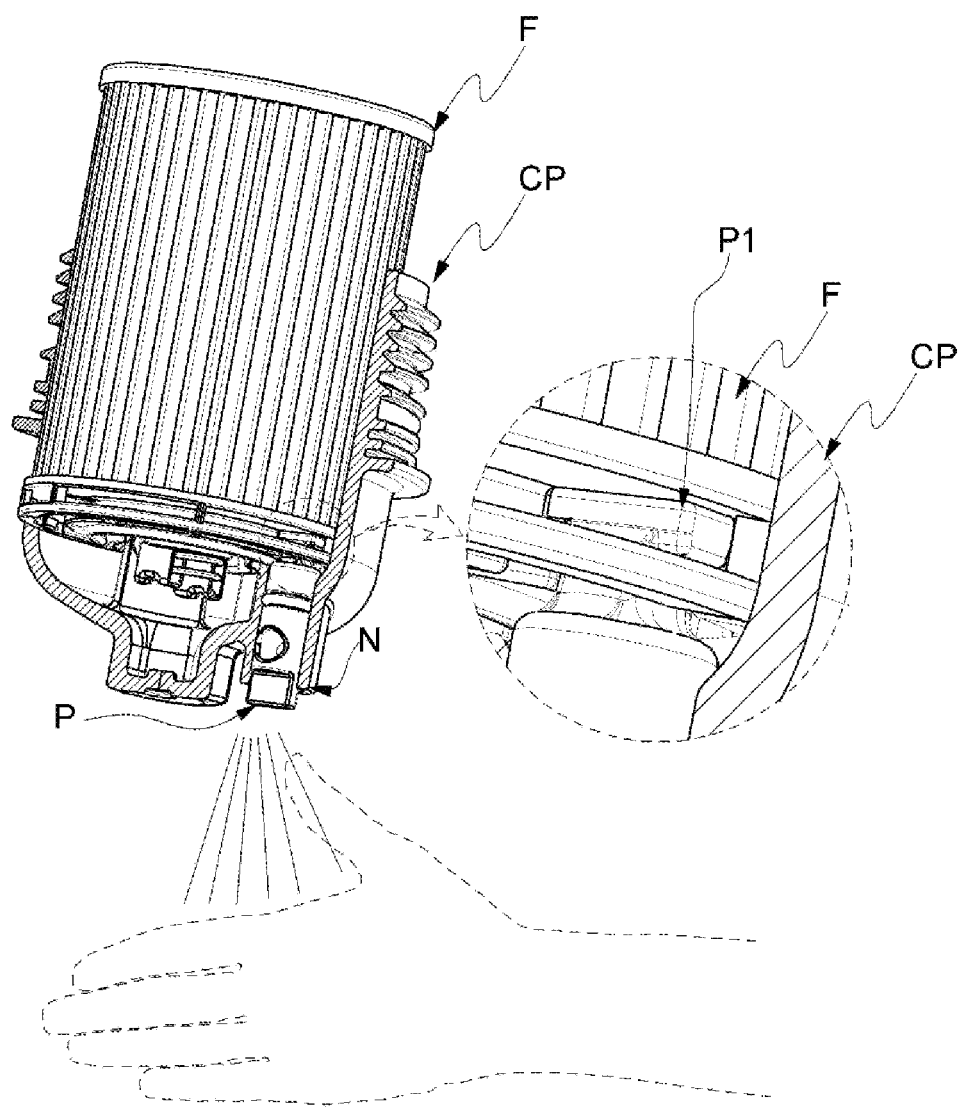
FIG. 1 is a partial sectional view of a general oil filter unit.
Figure 2:
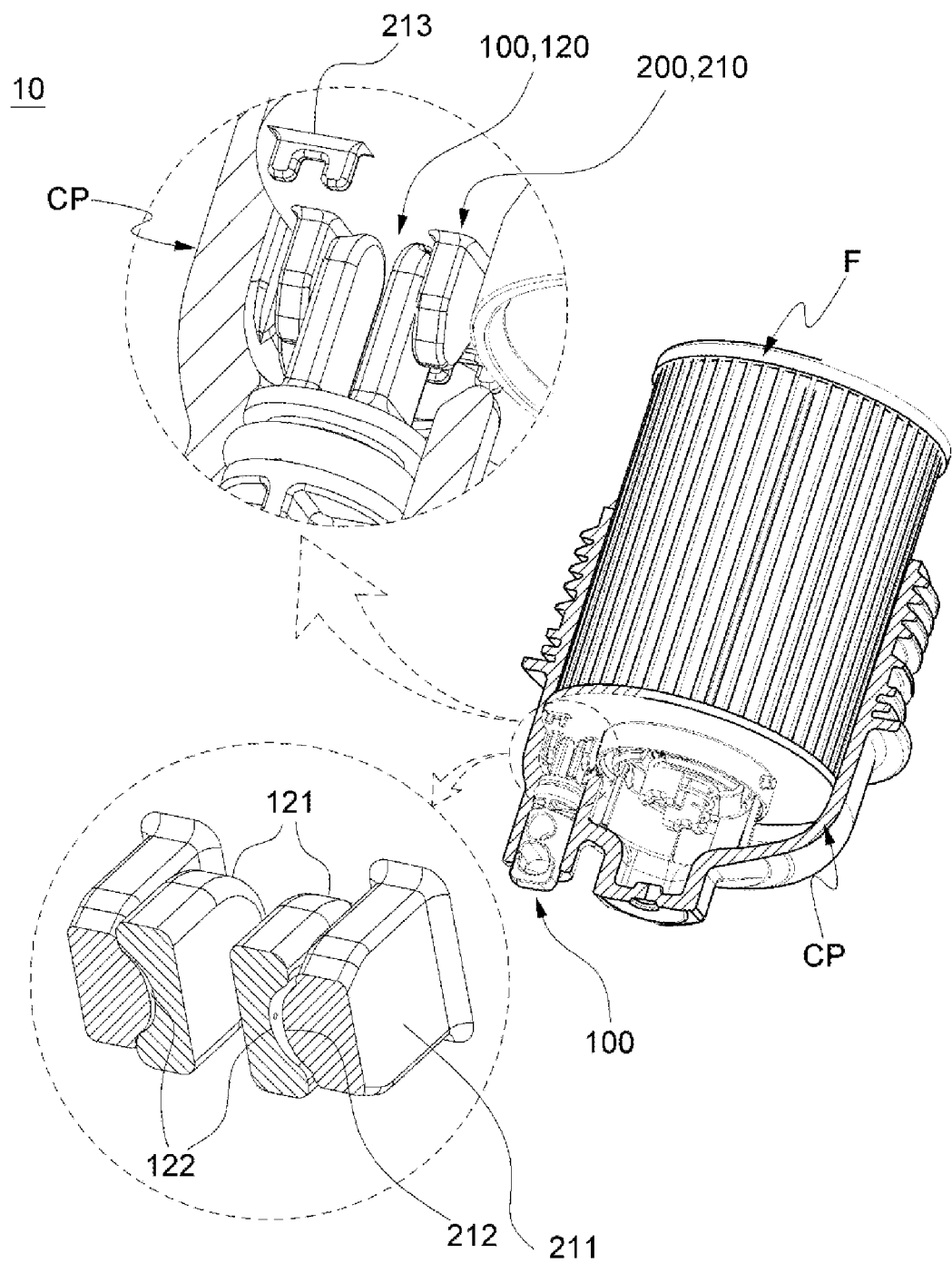
FIG. 2 is a perspective view of a filter of an oil filter unit and a sectional view of a cap of an oil filter unit in a state of the filter and the cap connected to each other according to one embodiment of the present invention.
Figure 3:
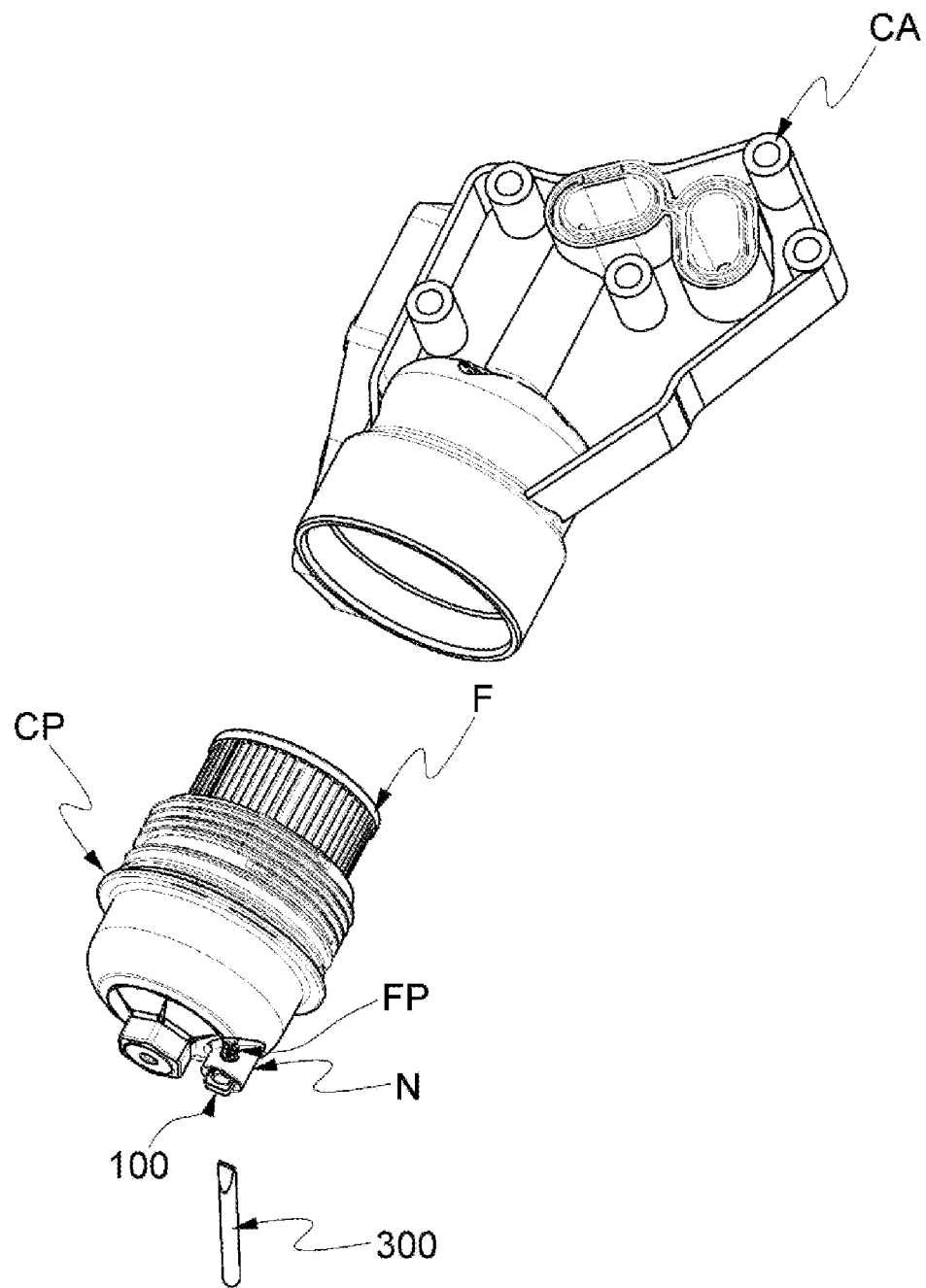
FIG. 3 is an exploded perspective view of an oil filter unit according to one embodiment of the present invention.

Hereafter, the present invention will be described in more detail. In the drawings, the thicknesses of lines or the sizes of the elements may be exaggerated for clarity.

The terminology used herein is defined for the purpose of describing functions of the present invention; thus, it may be varied depending on an intention of a user or a convention in this technical field.

The embodiments below are not restricting or limiting the scopes of the inventive concepts but illustrating elements of the claims. The embodiment that includes the equivalent of the element of the following claim shall be within the scope of the present invention.

Referring to FIGS. 2 to 5, an oil filter unit 10 according to one embodiment of the present invention comprises a cap CP receiving a filter F; a drain pin 100 disposed on a bottom side of the filter F; and a capturing part 200 disposed on a bottom side of the filter F and detachably and rotatably capturing the drain pin 100, wherein the capturing part 200 comprises a rotational capturing part 210 which rotatably captures the drain pin 100 by coupling a female and a male connecting portion.

Thus, according to the present invention, the drain pin 100 which is easily separated, can improve the work efficiency. In addition, since the drain pin 100 can be placed in a level similar to a bottom side of the filter F by rotating the drain pin 100, a plurality of the oil filter units can be tightly arranged without space, which enables to reduce the load volumes of multiple oil filter units.

Meanwhile, the drain pin 100 may penetrate through a drain nipple N of the cap CP, and disposed in a bottom side of the filter F. This structure is similar to the general structure, and detailed explanation will be omitted.

In addition, the cap CP is equipped in a case CA, and oil can pass through this cap CP. This structure is also similar to the general structure, and detailed explanation will be omitted.

The rotational capturing part 210 comprises a pair of second brackets 211 which protrudes in a vertical direction from the bottom side of the filter F and that spaced apart from each other; and a protruding part 212 which protrudes with a certain curvature at inner lateral sides of the second brackets 211, which face each other.

Furthermore, the drain pin 100 comprises a drain pin body 110 having a bar shape; and a connecting part 120 disposed on a top end of the drain pin body 110 in a vertical direction and having two portions each having a plate shape and spaced apart from each other. In this instance, the connecting part 120 comprises a pair of first brackets 121 each having a plate shape; and a grooved part 122 formed with a certain curvature at outer lateral sides of the first brackets 121, which do not face each other, so that the protruding parts 212 are inserted into.

Thus, when the connecting part 120 of the drain pin 100 is inserted between the second brackets 211 of the rotational capturing part 210, the protruding part 212 of the second bracket 211 is inserted into the grooved part 122 of the first bracket 121. In this instance, the protruding part 212 has a hemisphere shape, and the grooved part 122 also has a hemisphere shape. With coupling between the protruding part 212 and the grooved part 122, the connecting part 120 of the drain pin 100 is fixed to the second bracket 211, and the protruding part 212 can be rotated inside the grooved part 122, which enables the drain pin 100 to be rotatable. In addition, when the operator draws the drain pin 100 downward, the drain pin 100 can be easily separated from the rotational connecting part 210, which can improve the work efficiency.

Figure 4:
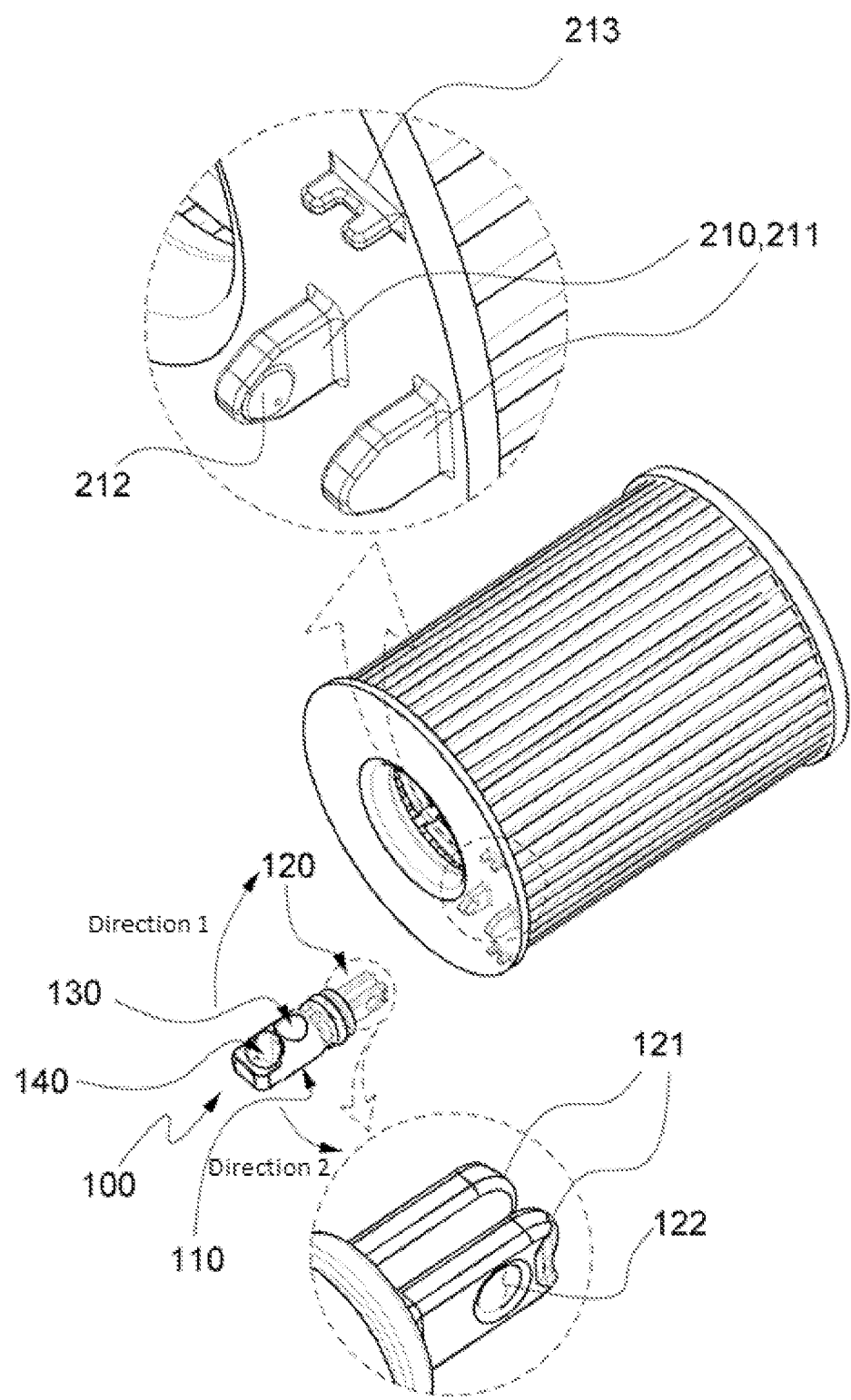
FIG. 4 is an exploded perspective view of a drain pin of an oil filter unit according to one embodiment of the present invention.

Moreover, as illustrated in FIG. 4, when the drain pin 100 is rotated in a direction 1 or a direction 2, the protruding part 212 is rotated inside the grooved part 122. Accordingly, a longitudinal direction of the drain pin 100 is parallel to a bottom surface of the filter F, and an end of the drain pin 100 can be disposed near a bottom side of the filter F. With this structure, a height of the oil filter unit 1 of the present invention is reduced, which can decrease the load volumes when multiple oil filter units are loaded.

In addition, the drain pin 100 may comprise a first through-hole 130 and a second through-hole 140 formed in the drain pin body 110. A fixing pin FP penetrates a through-hole N1 of the drain nipple N and the first through-hole 130, which fixes the drain pin 100 to the drain nipple N. Meanwhile, an inserting pin 300 may be inserted into the second through-hole 140. An operator can separate the drain pin 100 more easily using the inserting pin 300. Furthermore, the inserting pin 300 may prevent an operator from being contaminated by oil.

Thus, a portion of the second though-hole 140 is formed to be exposed to outside from the drain nipple N, and the inserting pin 300 from outside is inserted into the second through-hole 140. In this instance, the inserting pin 300 has a bar shape, a diameter of which becomes reduced as it comes closer to the drain pin 100. When the inserting pin 300 is inserted to the second through-hole 140, the drain pin 100 moves downward and is separated. In other words, since a front end of the inserting pin 300 has a relatively small diameter, it can be inserted into the second through-hole 140 which is partially exposed to outside from the drain nipple N. In this instance, when the inserting pin 300 is more inserted into the second through-hole 140, a diameter of the inserting pin 300 increases, which makes a top side of the inserting pin 300 meet a bottom side of the drain nipple N. When the inserting pin 300 is more deeply inserted into the second through-hole 140, a diameter of the inserting pin 300 continuously increases, which makes the drain pin 100 move down. As the drain pin 100 moves down for a certain distance, the drain pin 100 is separated from the capturing part 200. With this structure, the drain pin 100 can be separated more conveniently. In addition, since the separated drain pin 100 is fixed to the inserting pin 300, it does not fall free, which prevents oil from spattering.

Figure 5:
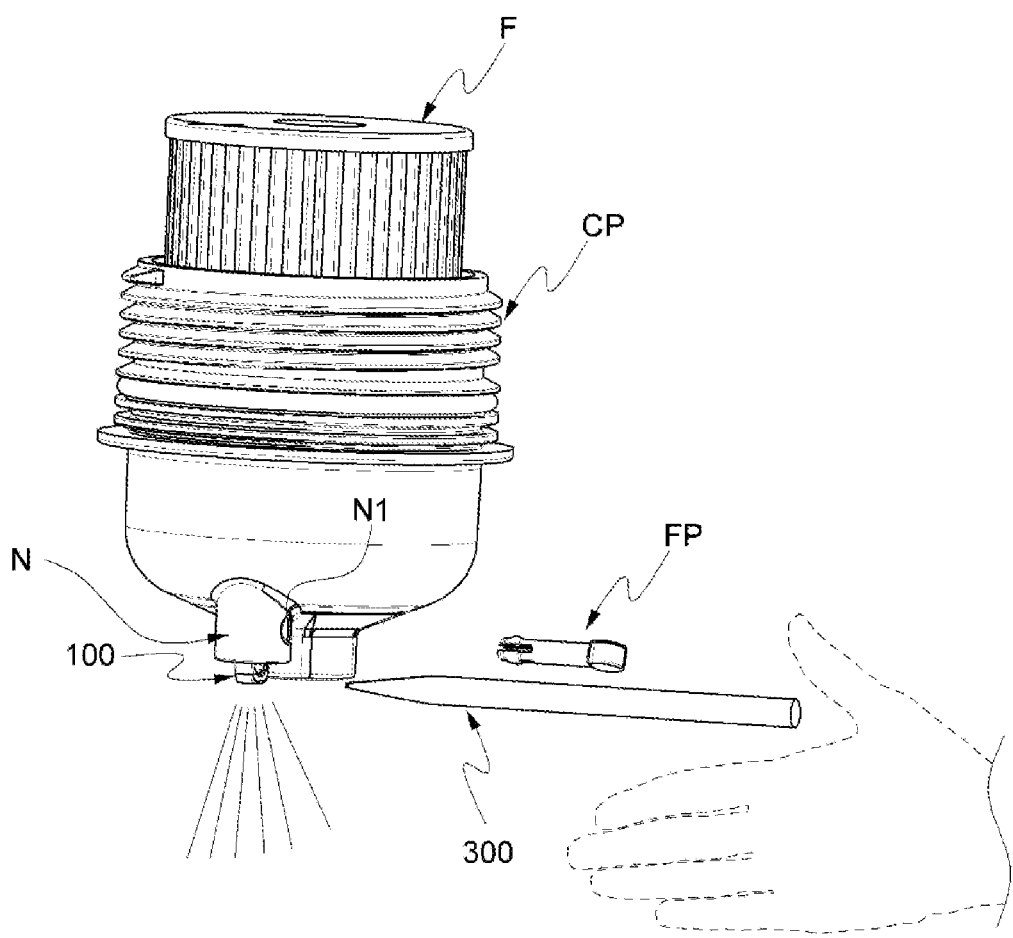
FIG. 5 is a perspective view showing a connecting relation of a fixing pin and an inserting pin of an oil filter unit according to one embodiment of the present invention.

Furthermore, as illustrated in FIG. 5, since a hand of an operator holds the inserting pin 300, the hand is spaced apart from the drain pin 100 in a horizontal direction. With this structure, although oil is leaked by separating of the drain pin 100, a hand of an operator is not contaminated by oil.

Figure 6:
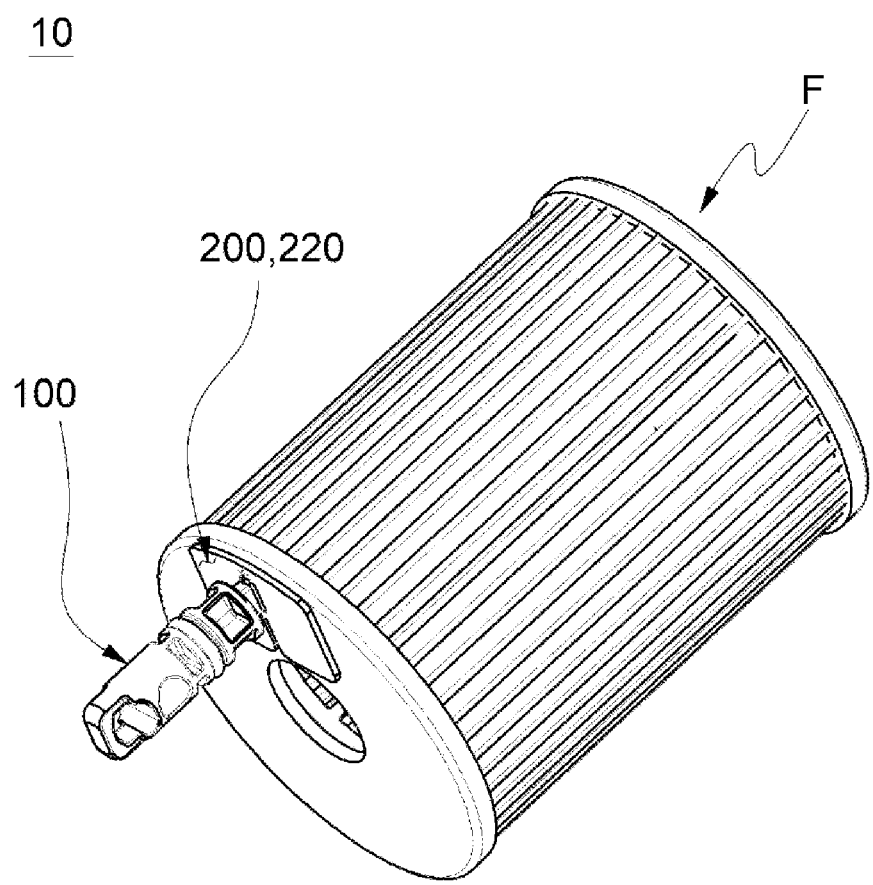
FIG. 6 is a perspective view of an oil filter unit according to another embodiment of the present invention.
Figure 7:
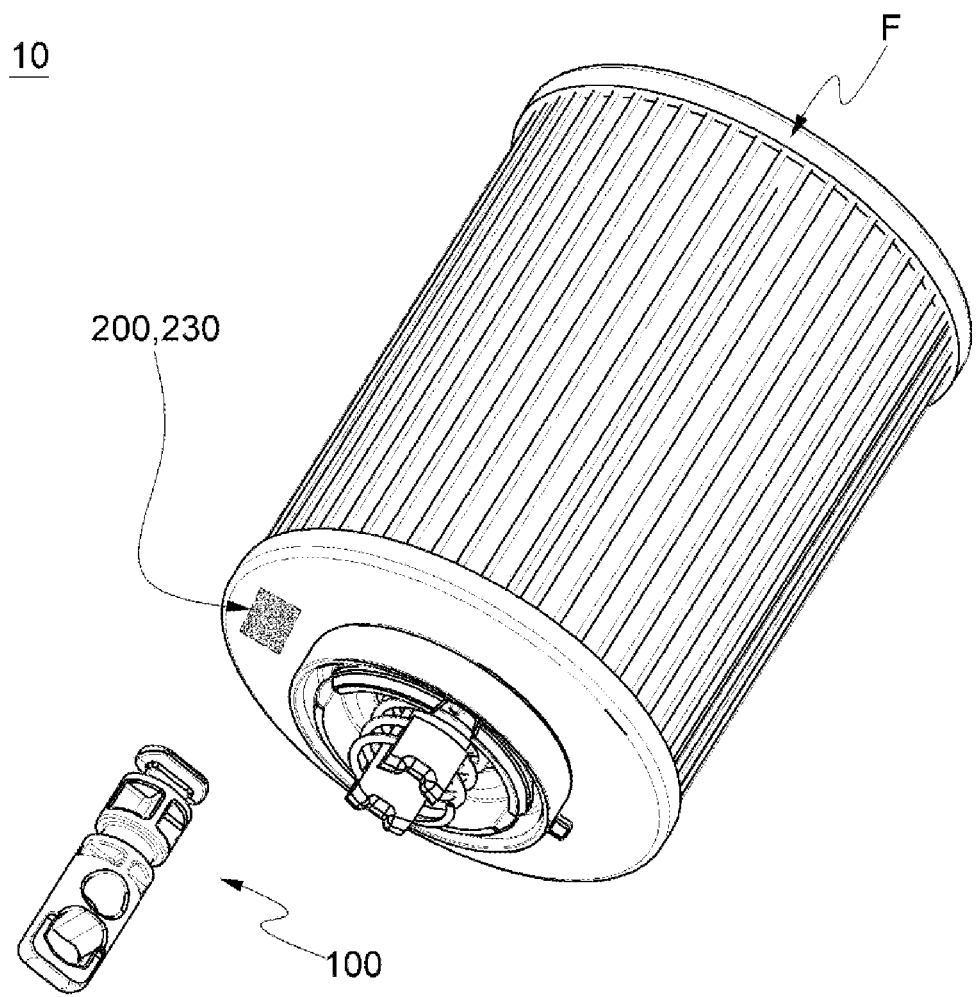
FIG. 7 is a perspective view of an oil filter unit according to another embodiment of the present invention.

In addition, as illustrated in FIG. 6, the capturing part 200 may comprise a paper 220 which is connected to the bottom side of the filter F by ultrasonic welding. In this instance, the drain pin 100, which is connected to the paper 220, may be separated more easily.

Figure 8:
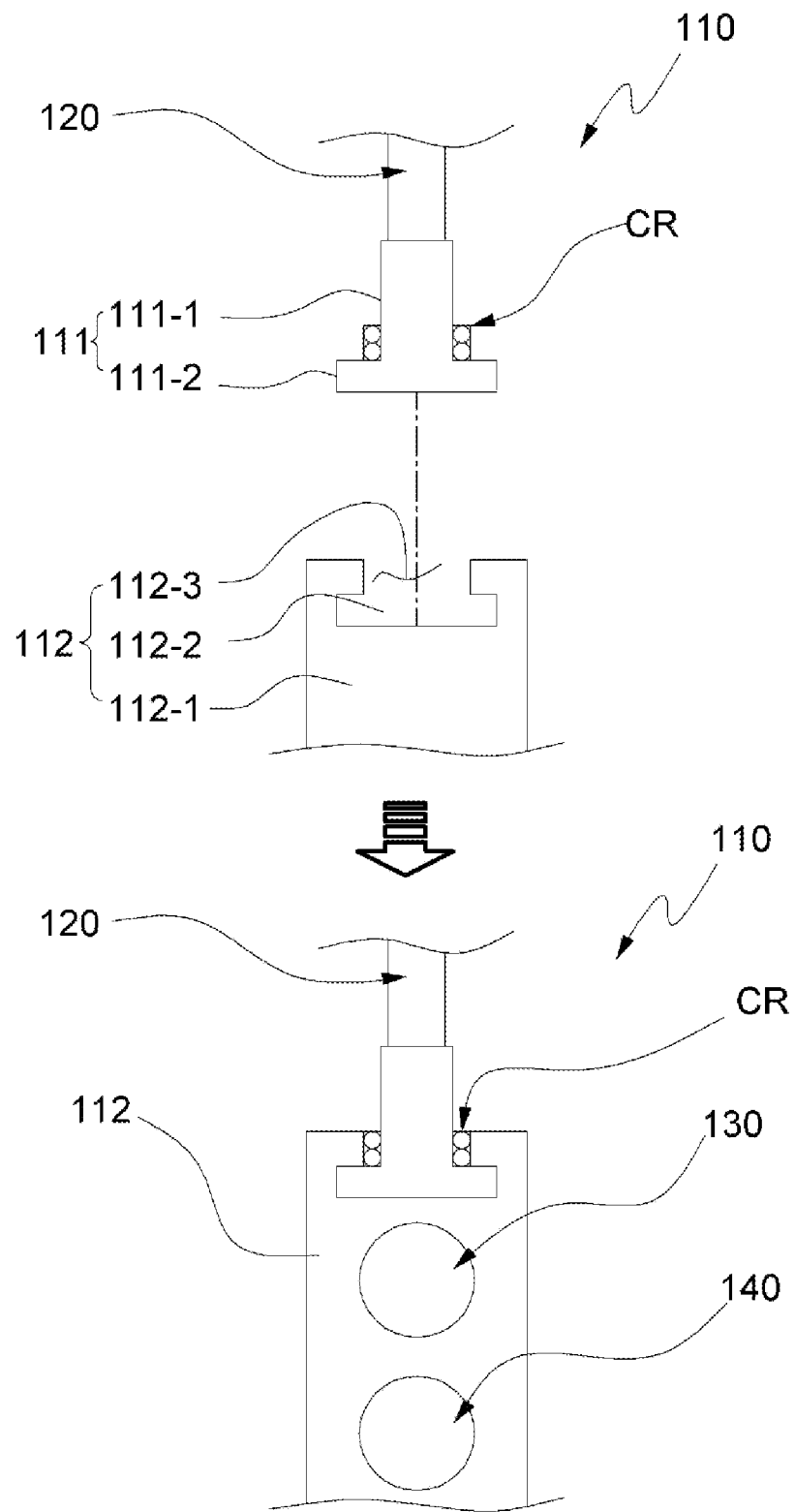
FIG. 8 is a schematic drawing showing connecting relations of a cross roller bearing according to one embodiment of the present invention.

Meanwhile, as illustrated in FIG. 8, the drain pin body 110 further comprises a first body 111 that the connecting part 120 is formed in; a second body 112 that the first body 111 is rotatably connected to; and a cross roller bearing CR that is disposed between the first body 111 and the second body 112. The second body 112 comprises the first through-hole 130 and the second through hole 140, which are described above. Thus, the fixing pin FP is inserted into the first though-hole 130, and the inserting pin 300 is inserted into the second through-hole 140.

As described above, the connecting part 120 of the drain pin 100 and the capturing part 200 have to form a certain angle in order to connect between the drain pin 100 and the capturing part 200. In other words, when the connecting bracket 121 of the connecting 120 forms a certain angle with the rotational capturing part 210, the protruding part 212 and the grooved part 122 can be engaged to each other. In some cases, when the oil filter unit 10 is twisted due to surrounding vibration or a force, an angle formed by the drain pin 100 and the rotational capturing part 210 may not be maintained within a range of acceptable angle. In this instance, a connecting state between the connecting part 120 and the rotational capturing part 210 may be out of a range of acceptable state, which disturbs a connection or a separation between the connecting part 120 and the rotational capturing part 210. Furthermore, when connecting the drain pin 100 to the rotational capturing part 210, the first though-hole 130 of the drain pin 100 may be misaligned with the though-hole N1 of the drain nipple N, which makes it difficult for the fixing pin FP to be inserted through the first though-hole 130 and the though-hole N1.

In order to solve this problem, the drain pin body 110 further comprises the first body 111 that the connecting part 120 is formed in, and the second body 112 that the through-hole 130 is formed in. In addition, the first body 111 is rotatably connected to the second body 112. According to this structure, although surrounding vibration or an external force generates a rotational force in the drain pin 100 or the capturing part 200, the first body 111 absorbs it by rotating itself.

The first body 111 comprises a first stem 111-1 that the connecting part 120 is formed in and that has a bar shape; and a ledge 111-2 that is formed under the first stem 111-1 and a diameter thereof is bigger than that of the first stem 111-1.

In addition, the second body 112 comprises a second stem 112-1 having a bar shape; a though-hole 112-3 that is formed at a top surface of the second stem 112-1; and a receiving part 112-2 that is formed under the through-hole 112-3 and that receives the ledge 111-2. The ledge 111-2 is elastically deformed and enters into the through-hole 112-3, and the first stem 111-1 is partially inserted into the through-hole 112-3.

Thus, the ledge 111-2 of the first body 111 is elastically deformed and enters into the receiving part 112-2, and the first stem 111-1 of the first body 111 is inserted in the through-hole 112-3. With this ledge 111-2, the first body 111 is not separated from the second body 112 and stably connected to it.

Meanwhile, the cross roller bearing CR is disposed between the first stem 111-1 and the through-hole 112-3. In this instance, the cross roller bearing CR comprises a retainer 400 that is disposed between multiple rollers CR1.

Figure 9:
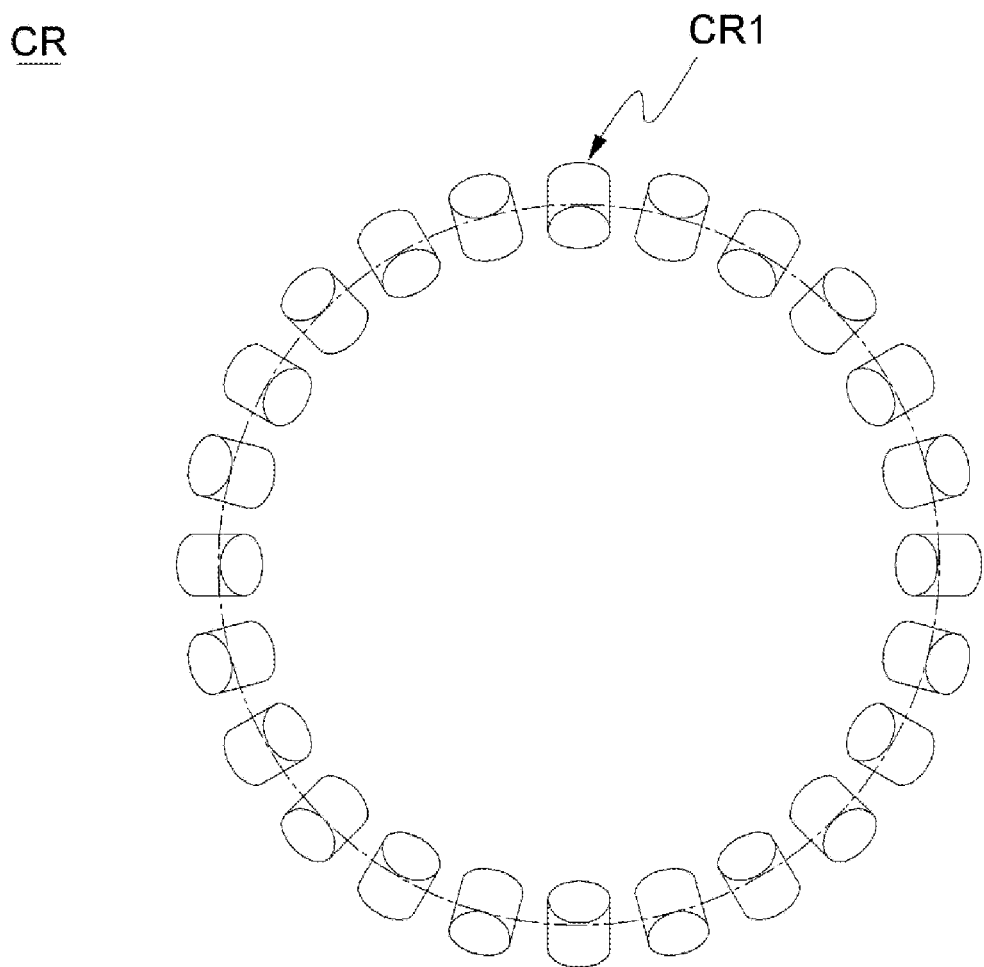
FIGS. 9 and 10 are schematic drawings of a general cross roller bearing.
Figure 10:
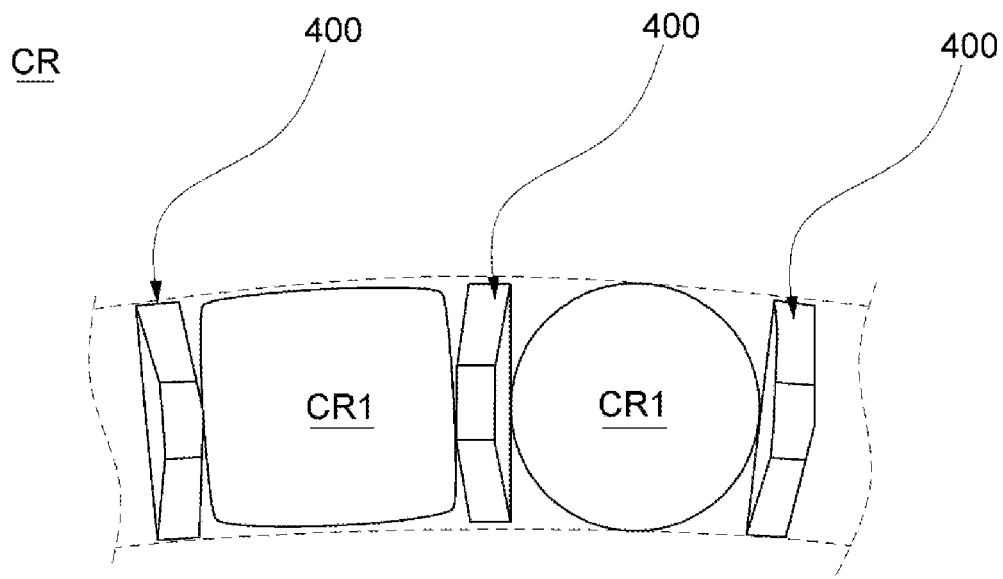

As illustrated in FIGS. 9 and 10, the cross roller bearing CR is a widely known bearing, which rollers CR1 cross each other at a right angle. This cross roller bearing can endure weights in various directions and has high degree in hardness, precision, and durability for its small size. In many cases, there may be forces in various directions, which affects the first stem 111-1 of the oil filter unit 1. Accordingly, it is preferred to use a roller bearing for a bearing rotatably supporting the first stem 111-1.

The cross roller bearing CR, as illustrated in FIG. 10, comprises a retainer 400. The retainer 400 is disposed between rollers CR1 and has a through-hole (not shown) at a side, which enables a flow of grease. A cross roller bearing itself is widely known in this technical field. For example, Korean Patent No. 10-1953941 and Korean Patent No. 10-1621626 discloses a cross roller bearing in detail. Accordingly, the detailed explanation and illustration of a cross roller bearing will be omitted.

Meanwhile, as illustrated in FIGS. 11 to 14, the cross roller bearing CR comprises a retainer 400 disposed between multiple rollers CR1, and the retainer 400 comprises a first retainer body 410 and a second retainer body 410. The first and the second retainer body 410, 420 has a plate shape and are connected to each other. The first and the second retainer body 410, 420 may be connected to each other by bolts or adhesive. In addition, inner lateral sides of the first and the second retainer body 410, 420, which face each other, are flat, and outer lateral sides of the first and the second retainer body 410, 420, which do not face each other, may protrude with a certain curvature.

In this instance, the first and the second retainer body 410, 420 comprises a plurality of flow holes other than a through hole TH and a buffering part 500 described later. Grease flows through the through-hole TH; however, the through-hole TH cannot guarantee a stable flow of grease when grease is in a state of an instant high pressure by external shock. The structure described below is introduced in order to solve this problem.

Figure 11:
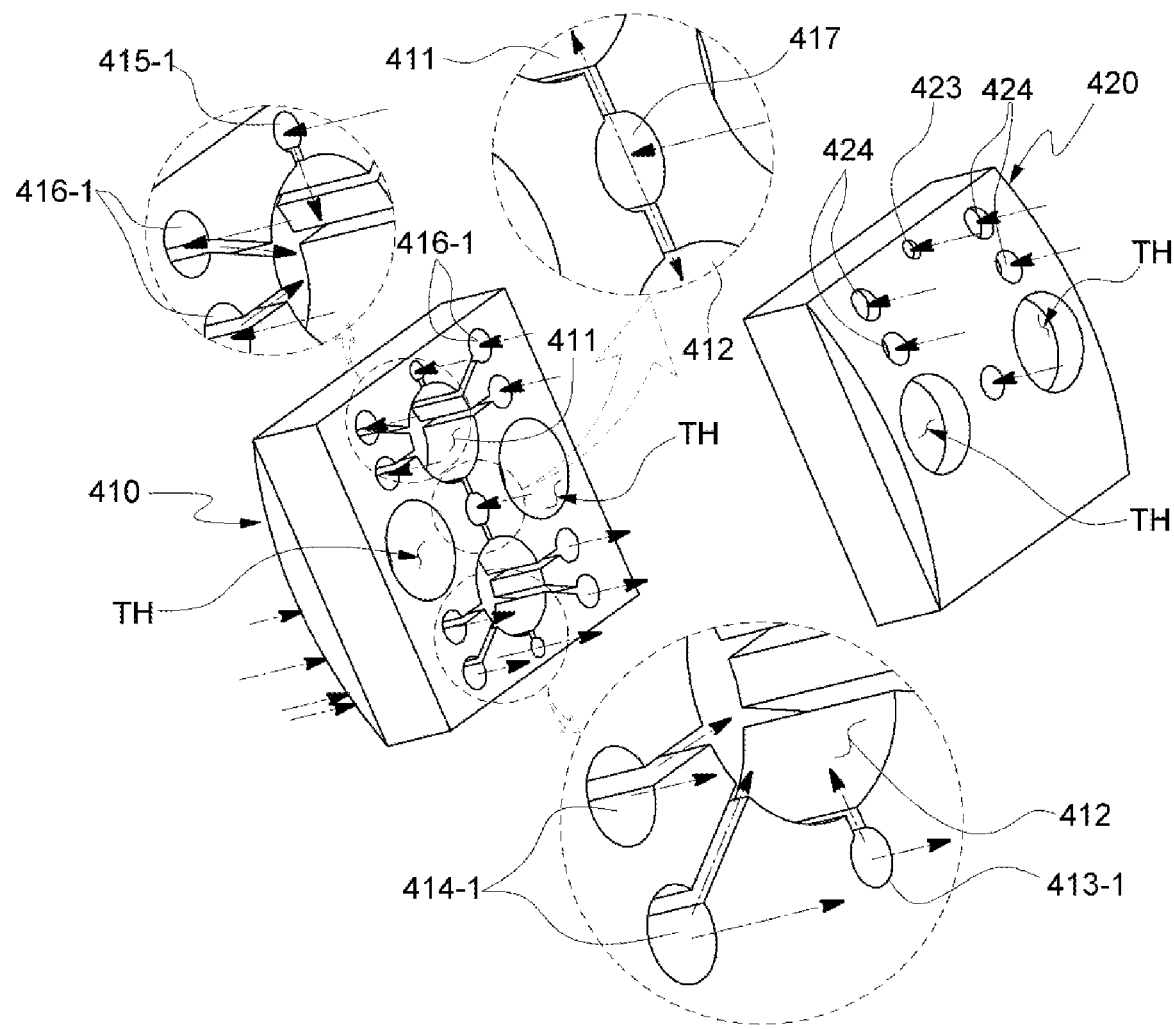
FIGS. 11 to 14 are perspective views of a retainer of a cross roller bearing according to some embodiment of the present invention.
Figure 12:
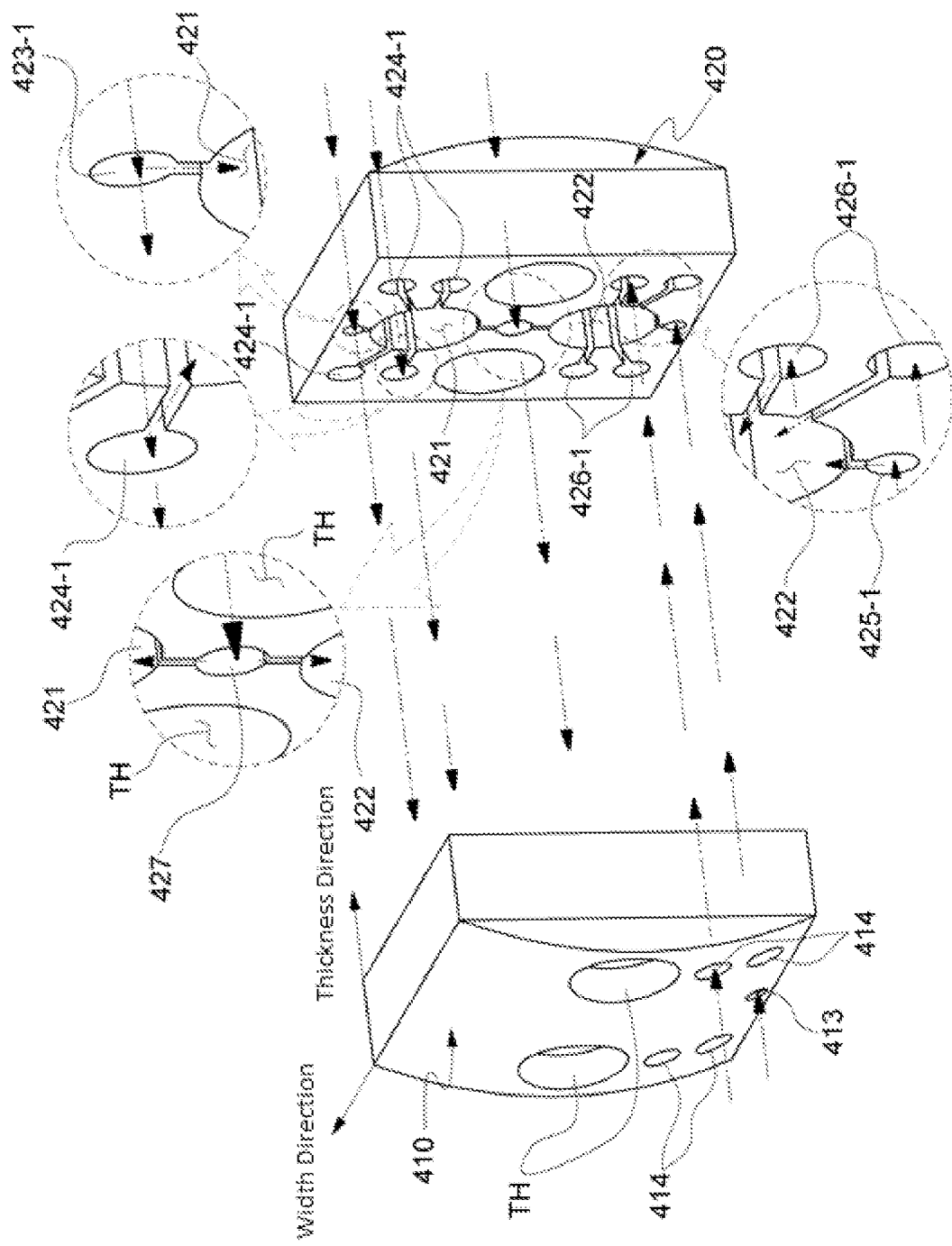

As illustrated in FIG. 12, the through-hole TH, a first center inflow hole 413, and a first lateral inflow hole 414 are formed at an outer lateral side of the first retainer body 410, which is an opposite side to the second retainer body 420 (the left side of the first retainer body 410 in FIGS. 11, 12). The first center inflow hole 413 and the first lateral inflow hole 414 are formed under the through-hole TH. The first center inflow hole 413 is formed in a bottom center spot in a width direction. The first lateral inflow hole 414 is plural, and a plurality of first lateral inflow holes 414 are formed at both sides of the first center inflow hole 413 in a width direction. In case of the illustrated embodiment, the first lateral inflow hole 414 is respectively formed at a top and a bottom portion of both sides of the first center inflow hole 413. Thus, four of the first lateral inflow holes 414 are formed in the first center inflow hole 413.

In addition, as illustrated in FIG. 11, a first top receiving groove 411 and a first bottom receiving groove 412 are formed at an inner lateral side of the first retainer body 410, which faces the second retainer body 420 (the right side of the first retainer body 410 in FIGS. 11, 12). Each of the first top receiving groove 411 and the first bottom receiving groove 412 is extended in a thickness direction, and the first top receiving groove 411 and the first bottom receiving groove 412 are spaced apart in a height direction. In this instance, the through-holes TH are formed at both sides of the first top receiving groove 411 and the first bottom receiving groove 412.

A first center communicating hole 413-1 is formed under the first bottom receiving groove 412, and communicated with the first center inflow hole 413. In addition, a first lateral communicating hole 414-1 is formed at both sides of the first center communicating hole 413-1 in a width direction, and communicated with the first lateral inflow hole 414. In this instance, a flow path FL is formed between the first center communicating hole 413-1 and the first bottom receiving groove 412; and a flow path FL is also formed between the first lateral communicating hole 414-1 and the first bottom receiving groove 412. As illustrated, the flow path FL may be relatively narrow. With the flow path FL, the first center communicating hole 413-1 and the first bottom receiving groove 412 are communicated with each other; and the first lateral communicating hole 414-1 and the first bottom receiving groove 412 are also communicated with each other.

A first center storing groove 415-1 is formed above the first top receiving groove 411. A first lateral storing groove 416-1 is formed at both sides of the first top receiving groove 411 in a width direction. A third storing groove 417 is formed between the first top receiving groove 411 and the first bottom receiving groove 412. A flow path FL is formed between the first center storing groove 415-1 and the first top receiving groove 411; between the first lateral storing groove 416-1 and the first top receiving groove 411; and between the third storing groove 417 and the first lateral storing groove 416-1. The detailed description will be explained later.

Meanwhile, as illustrated in FIG. 11, the through-hole TH, a second center inflow hole 423, and a second lateral inflow hole 424 are formed at an outer lateral side of the second retainer body 420, which is an opposite side to the first retainer body 410 (the right side of the second retainer body 420 in FIGS. 11, 12). The second center inflow hole 423 and the second lateral inflow hole 424 are formed above the through-hole TH. The second center inflow hole 423 is formed in a top center spot in a width direction. The second lateral inflow hole 424 is plural, and a plurality of second lateral inflow holes 424 are formed at both sides of the second center inflow hole 423 in a width direction. Thus, a layout of the second center inflow hole 423 and the second lateral inflow hole 424 and a layout of the first center inflow hole 413 and the first lateral inflow hole 414 are symmetric with respect to a center width line.

As illustrated in FIG. 12, a second top receiving groove 421 and a second bottom receiving groove 422 are formed at an inner lateral side of the second retainer body 420, which faces the first retainer body 410 (the left side of the second retainer body 420 in FIGS. 11, 12). Each of the second top receiving groove 421 and the second bottom receiving groove 422 is extended in a thickness direction, and the second top receiving groove 421 and the second bottom receiving groove 422 are spaced apart in a height direction. A second center communicating hole 423-1 is formed above the second top receiving groove 422, and communicated with the second center inflow hole 423. In addition, a second lateral communicating hole 424-1 is formed at both sides of the second center communicating hole 423-1 in a width direction, and communicated with the second lateral inflow hole 424. In this instance, a flow path FL is formed between the second center communicating hole 423-1 and the second top receiving groove 421; and a flow path FL is also formed between the second lateral communicating hole 424-1 and the second top receiving groove 422.

A third communicating hole 427 is formed above the second bottom receiving groove 422. A second lateral storing groove 426-1 is formed at both sides of the second bottom receiving groove 422 in a width direction. A second center storing groove 425-1 is formed under the second bottom receiving groove 426-1. A flow path FL is formed between the second center storing groove 425-1 and the second bottom receiving groove 422; between the second lateral storing grove 426-1 and the second bottom receiving groove 422; and between the third storing groove 427 and the second bottom receiving groove 422.

Thus, the first top receiving groove 411 and the second top receiving groove 421 are respectively formed at sides of the first and the second retainer 410, 420, which face each other. In this instance, the first top receiving groove 411 and the second top receiving groove have an identical shape. Each communicating hole in the first and the second retainer 410, 420 also has an identical shape. However, the third communicating hole 427 is formed only in the second retainer 420.

Meanwhile, the first lateral communicating hole 414-1 and the first center communicating hole 413-1 are communicated with the second lateral storing groove 426-1 and the second center storing groove 425-1, respectively. In addition, the first lateral communicating hole 414-1 and the first center communicating hole 413-1 are also communicated with the first lateral inflow hole 414 and the first center inflow hole 413, penetrating through the first retainer body 410. However, the second lateral storing groove 426-1 and the second center storing groove 426-1 of the second retainer 420 are only dented and not penetrated.

In addition, the second lateral communicating hole 424-1 and the second center communicating hole 423-1 are communicated with the first lateral storing groove 416-1 and the first center storing groove 415-1, respectively. In addition, the second lateral communicating hole 424-1 and the second center communicating hole 423-1 are also communicated with the second lateral inflow hole 424 and the second center inflow hole 423, penetrating through the second retainer body 420. However, the first lateral storing groove 416-1 and the first center storing groove 416-1 of the first retainer 410 are only dented and not penetrated.

Hereafter, a process that grease flows through the retainer 400 of the present invention will be explained.

First, grease flows through the through-hole TH of the first retainer body 410 and the through-hole TH of the second retainer body 420.

After the grease enters through the first center inflow hole 413 and the first lateral inflow hole 414 of the first retainer body 410, the grease flows the first center communicating hole 413-1 and the first lateral communicating hole 414-1. Then, some of the grease flows into the first bottom receiving groove 412 through the flow path FL. The rest of the grease flows into the second center storing groove 425-1 and the second lateral storing groove 426-1 of the second retainer body 420, and then flows into the second bottom receiving groove 422 through the flow path FL.

Thus, in case that pressure on the grease instantly increases due to an external shock, the grease does not flow smoothly only with the through-holes TH. In this instance, the grease flows into the first center inflow hole 413 and the first lateral inflow hole 414 of the first retainer body 410 at first. Some of the grease, which is flowed into the first center inflow hole 413 and the first lateral inflow hole 414, flows into the first bottom receiving groove 412 through the flow path FL and heads to an absorbing part which is described later. The rest of the grease, which is flowed into the first center inflow hole 413 and the first lateral inflow hole 414, flows into the second center storing groove 425-1 and the second lateral storing groove 426-1 of the second retainer body 420. The grease which is flowed into the second center storing groove 425-1 and the second lateral storing groove 426-1, flows into the second bottom receiving groove 422 through the flow path FL and flows into an absorbing part which is described later. Accordingly, primarily, the grease flows into the absorbing part, and secondarily, the grease flows into the second center storing groove 425-1 and the second lateral storing groove 426-1. The second center storing groove 425-1 and the second lateral storing groove 426-1 temporarily store the grease that is in a condition of a high pressure. With this structure, although grease is in a state of an instant high pressure, the retainer 400 can absorb some of the grease and enable smooth flowing.

Likewise, an operation of the second retainer body 420 is similar to that of the first retainer body 410 described above. After the grease enters through the second center inflow hole 423 and the second lateral inflow hole 424 of the second retainer body 420, the grease flows the second center communicating hole 423-1 and the second lateral communicating hole 424-1. Then, some of the grease flows into the second top receiving groove 421 through the flow path FL. The rest of the grease flows into the first center storing groove 415-1 and the first lateral storing groove 416-1 of the first retainer body 410, and then flows into the first top receiving groove 411 through the flow path FL.

In this instance, the grease may enter through the third inflow hole 425 of the second retainer body 420. Some of the grease, which is flowed into the third inflow hole 425, flows into the second top receiving groove 421 and the second bottom receiving groove 422 through the third communicating hole 427, and then flows into the absorbing part. The rest of the grease, which is flowed into the third inflow hole 425, flows into the third storing groove 417 of the first retainer body 410. The grease in the third storing groove 417 flows into the first top receiving groove 411 and the first bottom receiving groove 412 through the flow path FL, and then flows into the absorbing part.

Hereafter, a buffering part 500 disposed between the first retainer body 410 and the second retainer body 420 will be explained referring to FIGS. 15 to 21.

The buffering part 500 is disposed in the first top receiving groove 411 and the first bottom receiving groove 412 of the first retainer body 410; and the second top receiving groove 421 and the second bottom receiving groove 422 of the second retainer body 420.

The buffering part 500 comprises an elastic storing part 510 that is elastically deformed by an inflow of grease; a supporting ring 520 that receives the elastic storing part 510 inside; and a foldable elastic part 530 that provides elasticity to the elastic storing part 510. Thus, the elastic storing part 510 is respectively disposed at the four receiving grooves 411, 412, 421, 422, and the supporting ring 520 and the foldable elastic part 530 are disposed outside the elastic storing part 510.

The elastic storing part 510 comprises an elastic storing part body 511 that is made of elastic materials and has a hollow shape; and an entering hole 512 that is formed at a side of the elastic storing part body 511 and grease flows through. Thus, grease in a state of an instant high pressure flows into the elastic storing part body 511, which is made of elastic materials such as rubber. When grease recovers its normal pressure, the grease stored in the elastic storing part body 511 flows to the outside, and the grease pressure inside the cross roller bearing is maintained within an acceptable range.

Meanwhile, the elastic storing part 510 is disposed inside the supporting ring 520 having a ring shape. The supporting ring 520 comprises a first supporting ring 521 and a second supporting ring 522 which are spaced apart from each other. A connecting frame 523 having a bar shape, is disposed between the first and the second supporting ring 521, 522. A plurality of connecting frames 523 are formed along circumferences of the first and the second supporting ring 521, 522. The plurality of connecting frames 523 are spaced apart from each other.

The foldable elastic part 530 is formed as a wave shape and disposed in a space between the connecting frames 523 along a circumferential direction of the supporting ring 521. Thus, as illustrated, the foldable elastic part 530 has a ˆ shape and is disposed along the circumferential direction; and the foldable elastic part 530 is disposed between the connecting frames 523. In this instance, a distance between the connecting frames 523 is longer than a horizontal width of a unit of a ˆ shape in the foldable elastic part 530. Accordingly, the connecting frames 523 can work properly when the foldable elastic part 530 is unfolded and extended in a horizontal direction and its width increases. In addition, a portion of the foldable elastic part 530 along the circumferential direction is opened. This opening portion is formed in order that the connecting frames 523 can work properly when the elastic storing part 510 is expanded. Specifically, when the elastic storing part 510 is expanded, the elastic storing part 510 meets the foldable elastic part 530, and thereby, the foldable elastic part 530 is unfolded and extended. In this instance, a width of the foldable elastic part 530 increases, but the opening portion of the foldable elastic part 530 can provide a space for an extended width. When the foldable elastic part 530 returns to its original shape by an elastic force after an expansion of the elastic storing part 510, the foldable elastic part 530 pressurizes the expanded elastic storing part 510 and forces the expanded elastic storing part 510 to return its original shape.

Meanwhile, a connecting part 540 is disposed between the elastic storing parts 510. The connecting part 540 stably maintains the elastic storing parts 510 by absorbing a structural change between the two elastic storing parts or a rotation of any one of the elastic storing parts 510.

Figure 20:
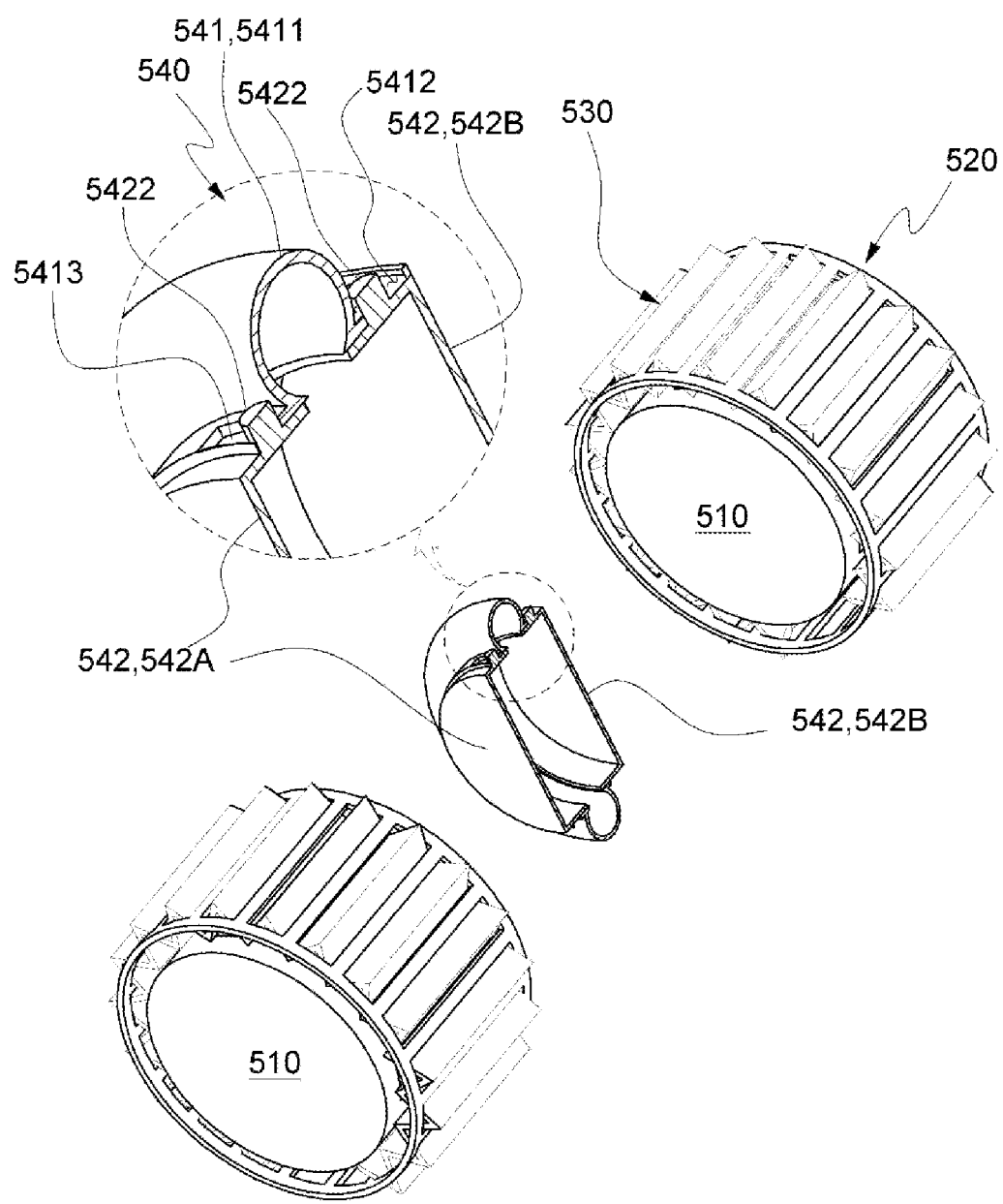
Figure 21:
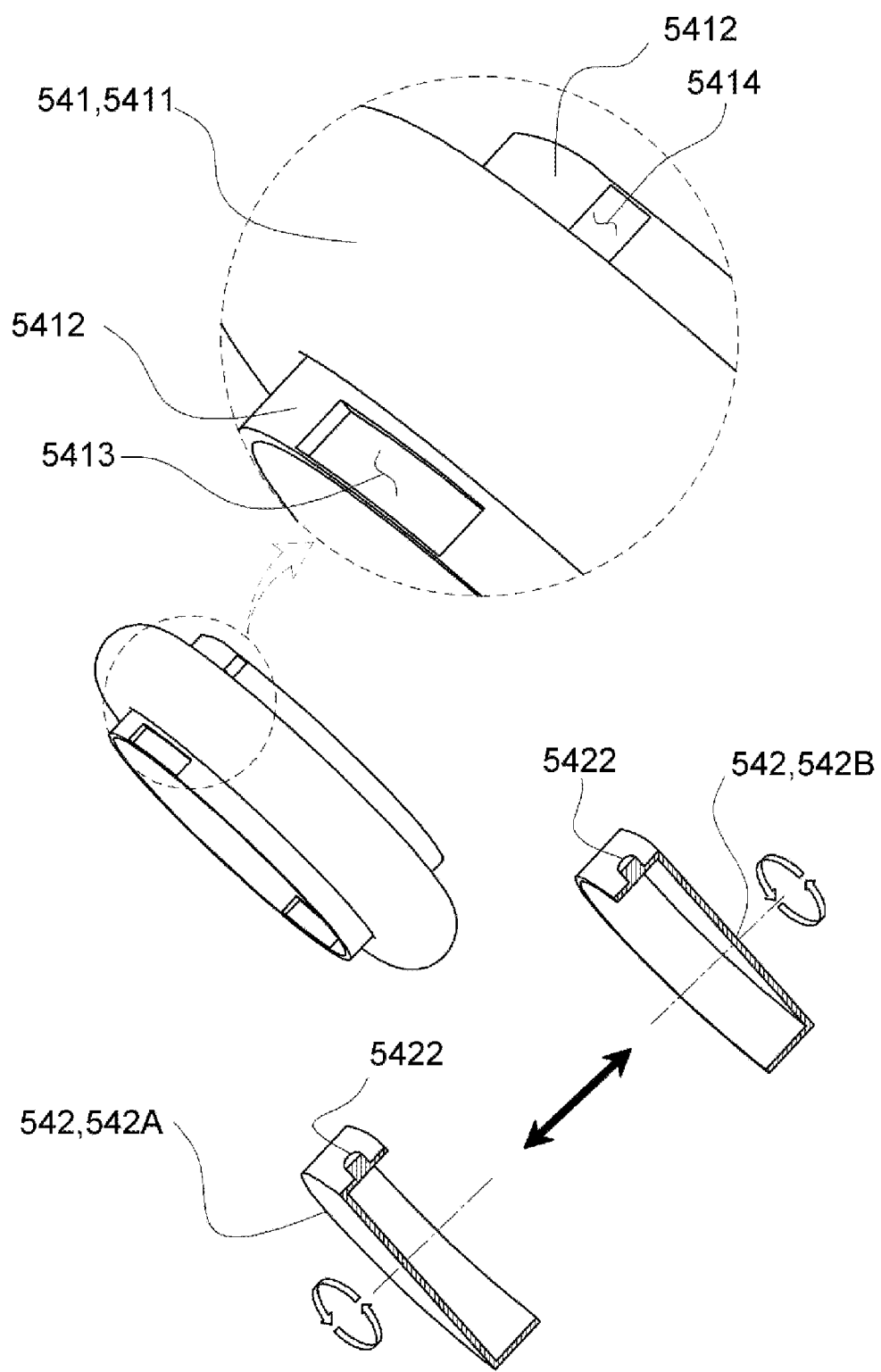

The connecting part 540 comprises an elastic part 541 having a ring shape; and covers 542 disposed at both sides of the elastic part 541 and respectively fixed to the elastic storing part 510. In this instance, the elastic part 541 comprises an elastic circular arc part 5411 having a circular arc shape in a cross section; and an extending part 5412 extended from both sides of the elastic circular arc part 5411 in a horizontal direction. The elastic circular arc part 5411 may have a certain circumference length. As illustrated in FIG. 20, the elastic circular arc part 5411 may have a Ω shape. The extending part 5412 is extended from both sides of the elastic circular arc part 5411 in a horizontal direction.

Figure 13:
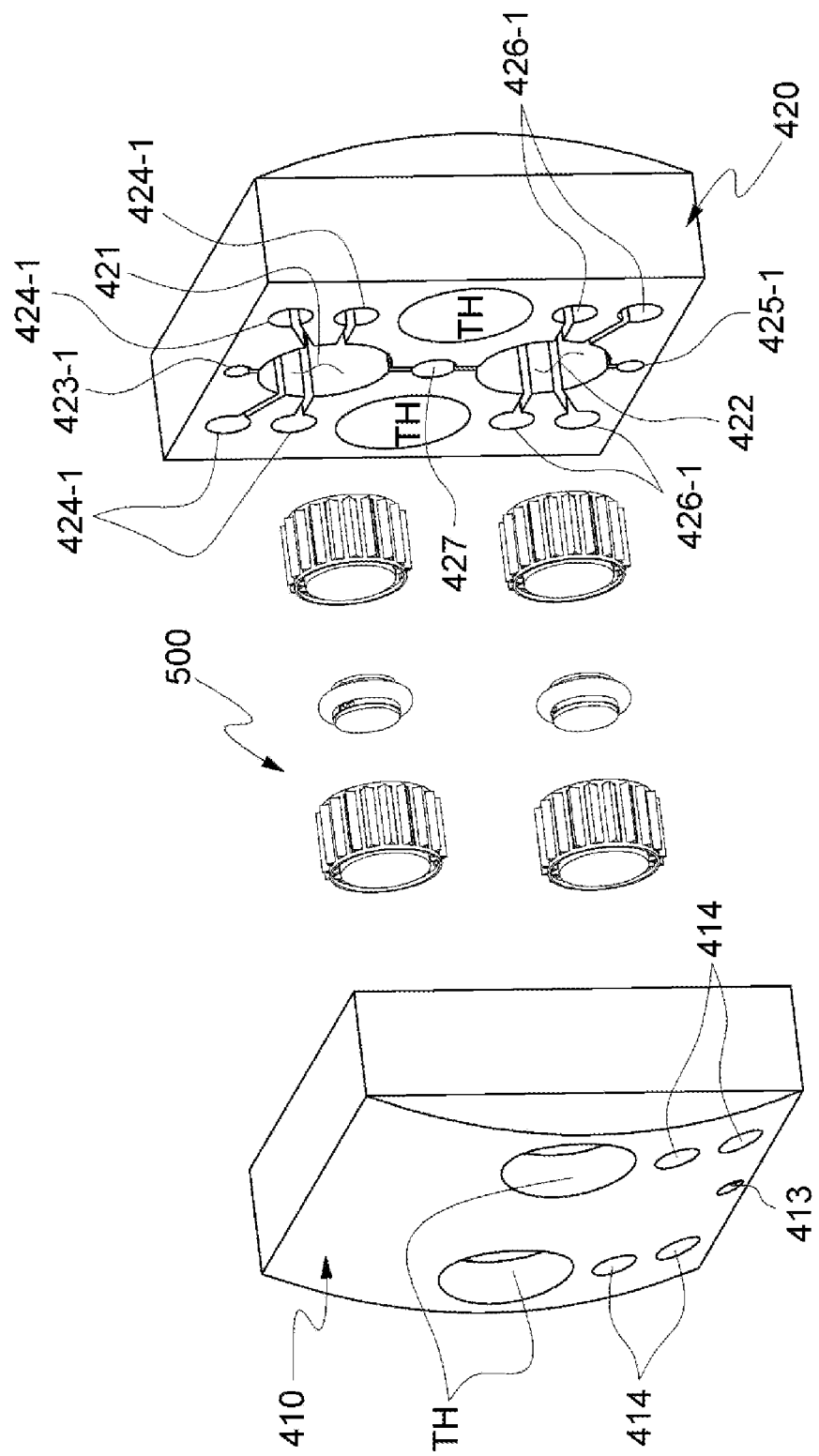
Figure 14:
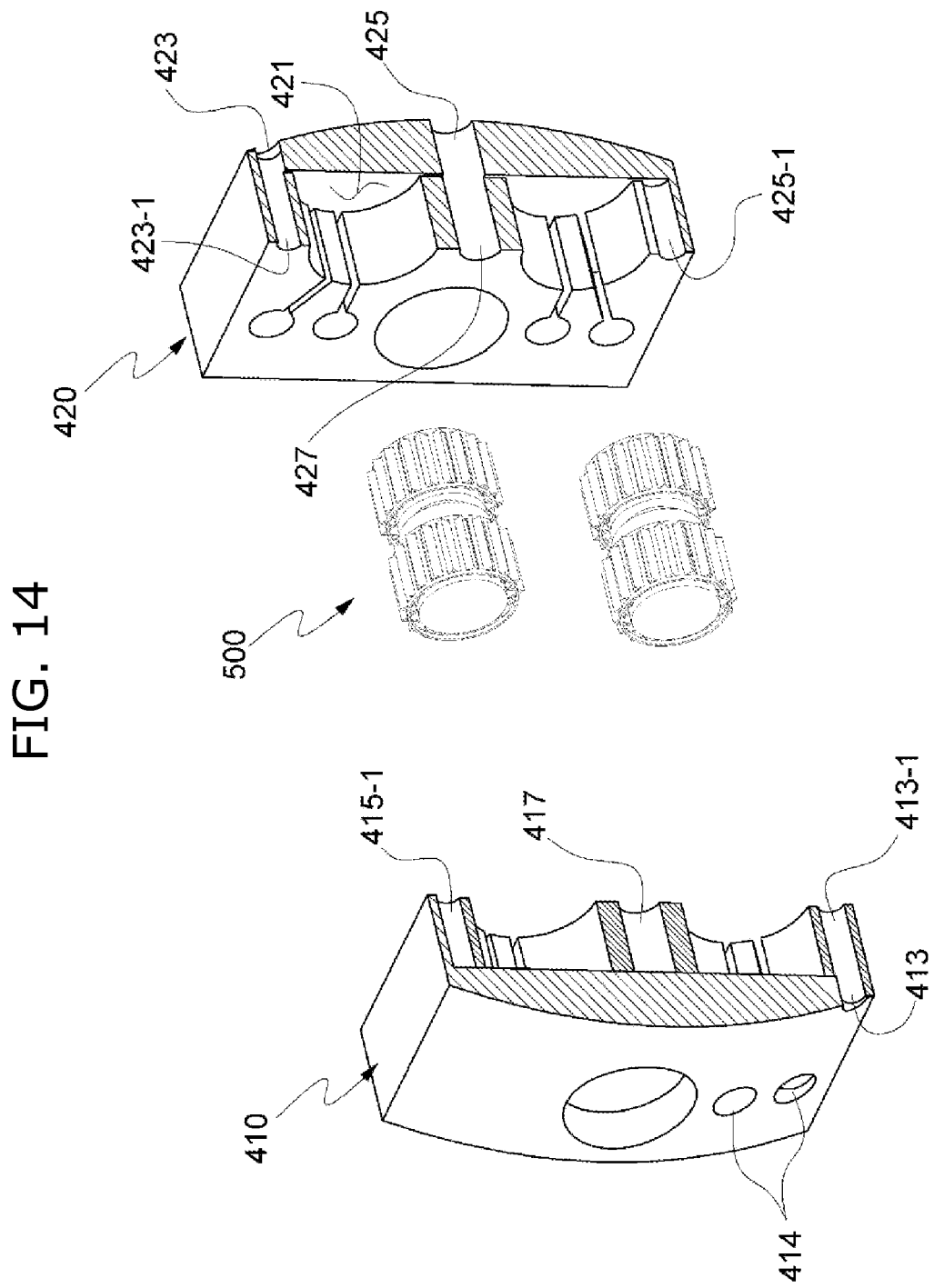
Figure 15:
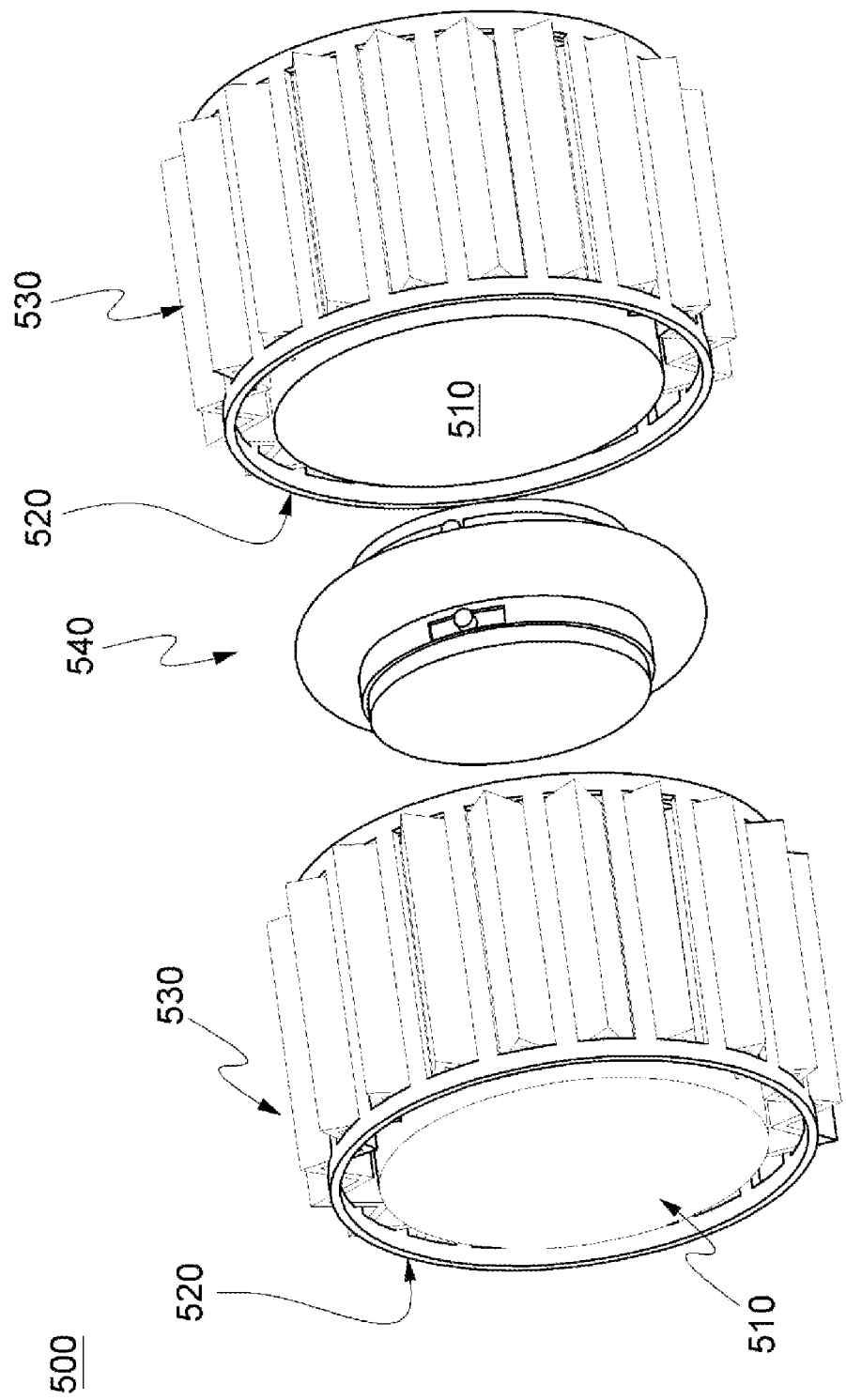
FIGS. 15 to 21 are perspective views of an absorption part of a cross roller bearing according to some embodiment of the present invention.
Figure 16:
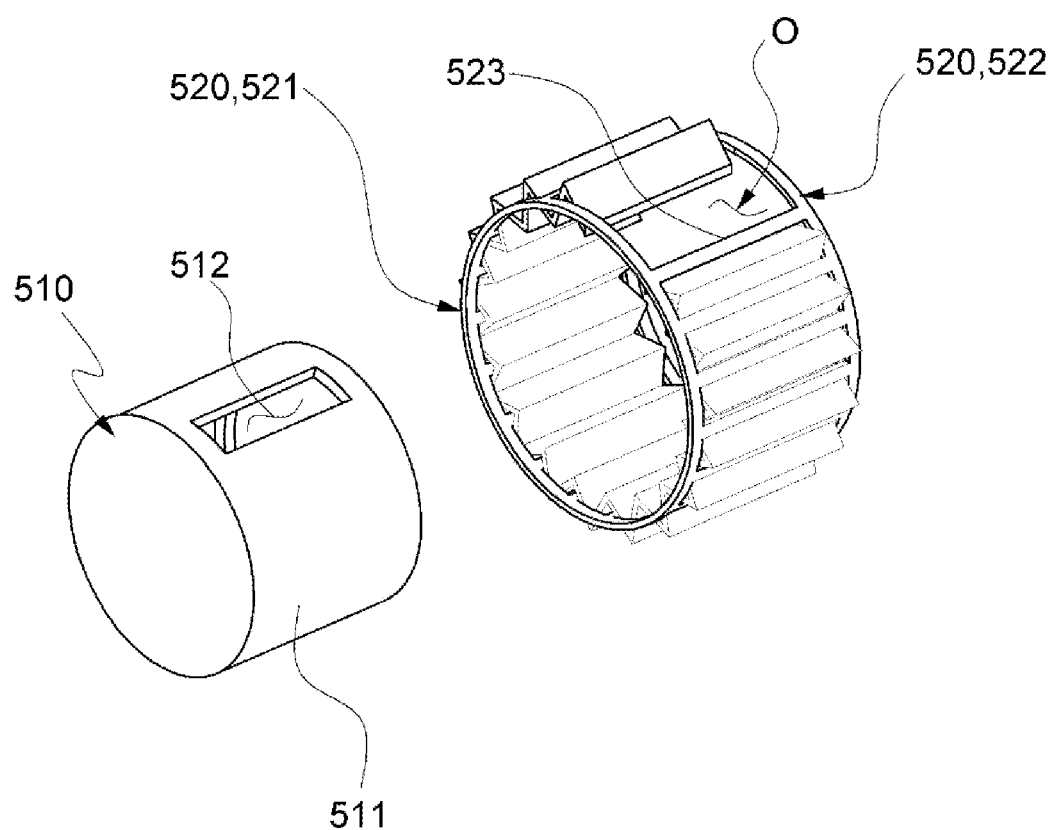
Figure 17:
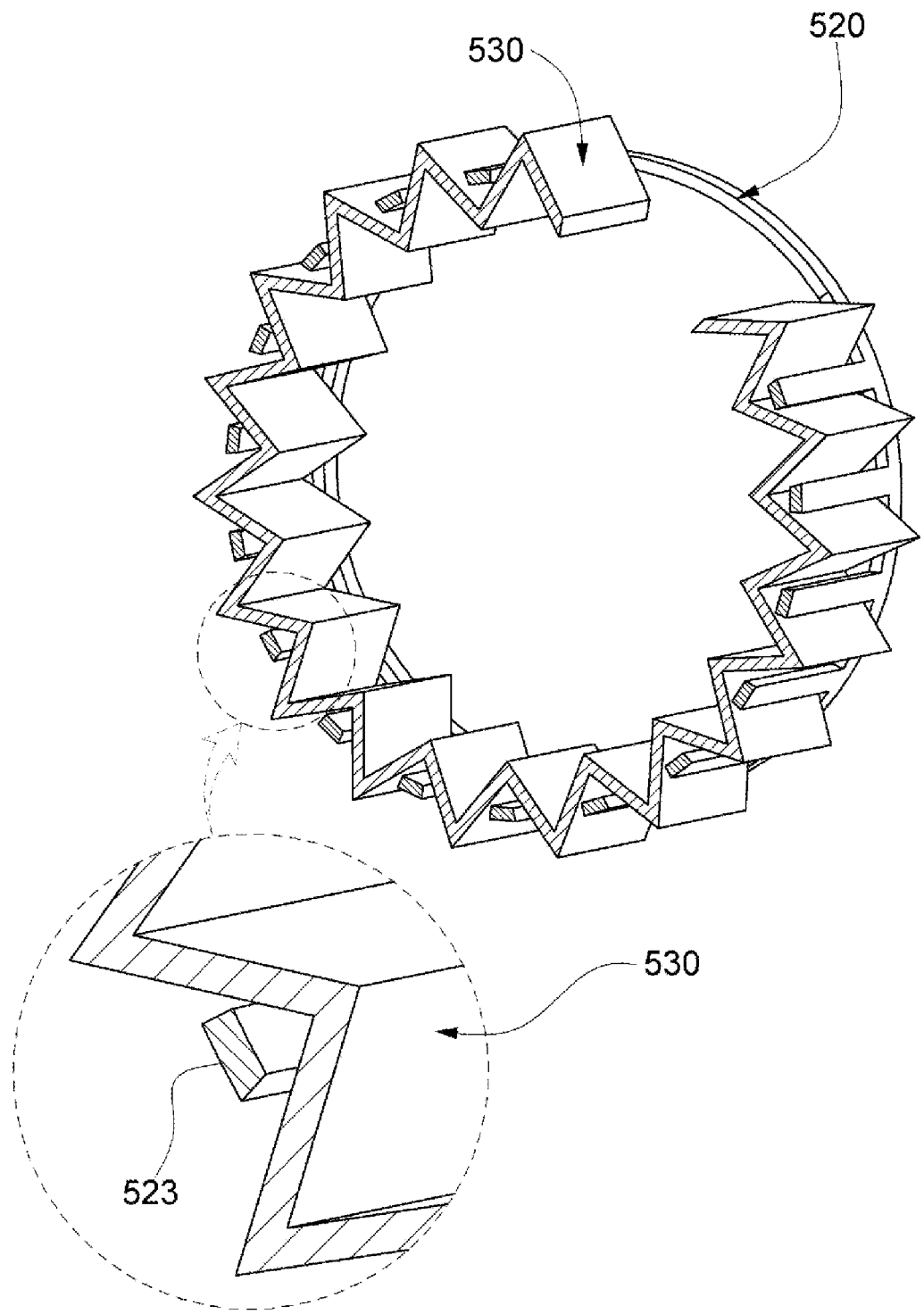
Figure 18:
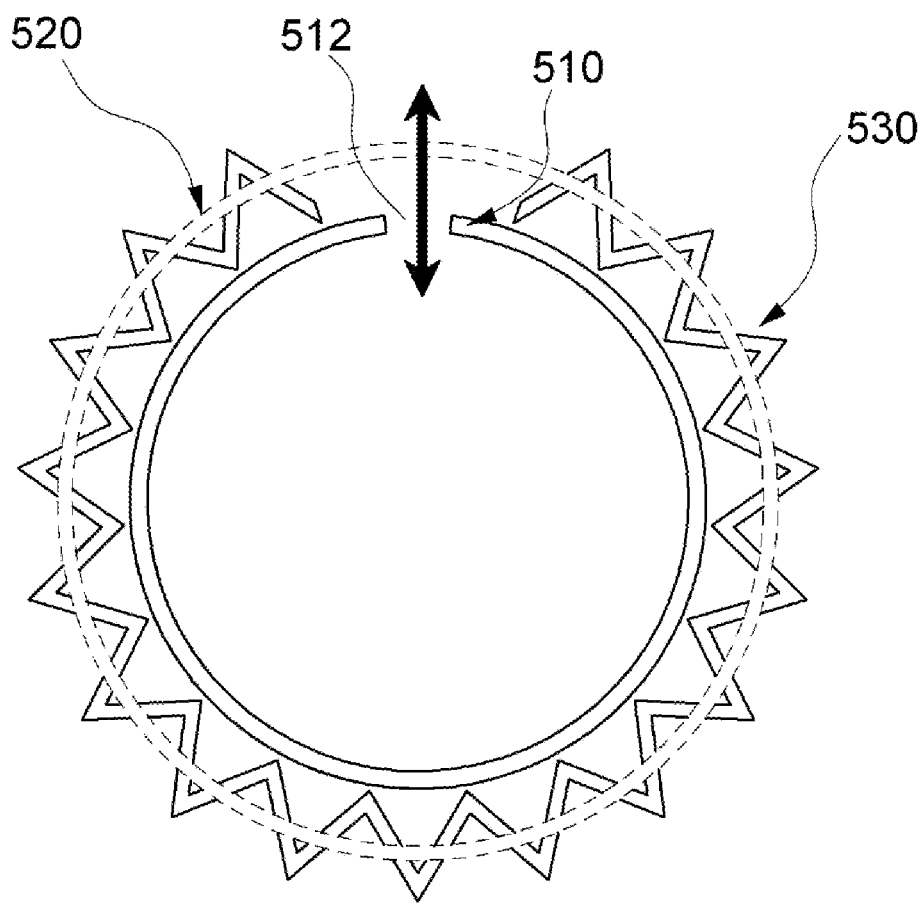

The covers 542 are disposed inside the extending part 5412. The covers 542 comprises a first cover 542A disposed at one side of the elastic part 541; and a second cover 542B disposed at the other side of the elastic part 541 and having a symmetrical shape to the first cover 542A. In other words, the cover 542, as illustrated in FIG. 13, are respectively disposed at both sides of the elastic part 541. The covers 542 at both sides of the elastic part 541 have symmetrical shapes in a left and a right direction. A lateral side of the cover 542 in a direction toward the elastic part 541 is opened. Thus, the cover 542 has a hollow shape, and comprises a cover body 5421 that is opened toward the elastic part 541. In this instance, an interlocking bump 5422 protrudes from the cover body 5421.

A first opening part 5413 is formed along a circumferential direction in the extending part 5412 that is disposed at one side of the elastic part 541. The interlocking bump 5422 is inserted into the first opening part 5413. In addition, a second opening part 5414 is formed along a circumferential direction in the extending part 5412 that is disposed at the other side of the elastic part 541. The interlocking bump 5422 is inserted into the second opening part 5414.

Thus, the first opening part 5413 is formed along a circumferential direction in the extending part 5412, and the interlocking bump 5422 is inserted into the first opening part 5413. Accordingly, when the elastic storing part that is interlocked with the cover 542A rotates for some reasons, the cover 542A rotates, and thereby the interlocking bump 5422 also rotates. However, since the interlocking bump 5422 rotates within the first opening 5413, a range of the rotational displacement is limited. When a rotational displacement of the interlocking bump 5422 rotates beyond the limited range of the rotary displacement, the interlocking bump 5422 is stuck at the end of the first opening part 5413, and thereby the extending part 5412 rotates together with the interlocking bump 5422. Since the extending part 5412 is integrated with the elastic circular arc part 5411 as one body, the elastic circular arc part 5411 also rotates, but its rotational range is significantly reduced. According to the present invention, a structural stability can be ensured by allowing a rotation within a certain range and limiting a rotation beyond the certain range, when the elastic storing part rotates.

In case of a structural change between the elastic storing parts, such as an increase of the distance between the two elastic storing parts, since the interlocking bump 5422 is stuck at the first opening part 5413, and the other interlocking bump 5422 is also stuck at the second opening part 5414, the elastic circular arc part 5411 is elastically widened to maintain the structural stability.

In contrast, in case of a decrease of the distance between the two elastic storing parts, the elastic circular arc part 5411 is elastically narrowed to maintain the structural stability.

Hereafter, the present invention will be explained referring to FIGS. 11 to 21 together.

As illustrated in FIG. 11, when a grease pressure in one side of the retainer 400, instantly increases, the grease flows through the through-hole TH, which lowers the pressure of the high pressure portion. When a grease pressure increases more, the grease flows into the first center inflow hole 413 and the first lateral inflow hole 414 of the first retainer body 410 at first. Some of the grease, which is flowed into the first center inflow hole 413 and the first lateral inflow hole 414, flows into the first bottom receiving groove 412 through the flow path FL and heads to an absorbing part 500. The rest of the grease, which is flowed into the first center inflow hole 413 and the first lateral inflow hole 414, flows into the second center storing groove 425-1 and the second lateral storing groove 426-1 of the second retainer body 420. The grease, which is flowed into the second center storing groove 425-1 and the second lateral storing groove 426-1, flows into the second bottom receiving groove 422 through the flow path FL and flows into the absorbing part 500. Accordingly, primarily, the grease flows into the absorbing part 500, and secondarily, the grease flows into the second center storing groove 425-1 and the second lateral storing groove 426-1. The second center storing groove 425-1 and the second lateral storing groove 426-1 temporarily store the grease that is in a condition of a high pressure. With this structure, although grease is in a state of an instant high pressure, the retainer 400 can absorb some of the grease and enable smooth flowing.

Figure 19:
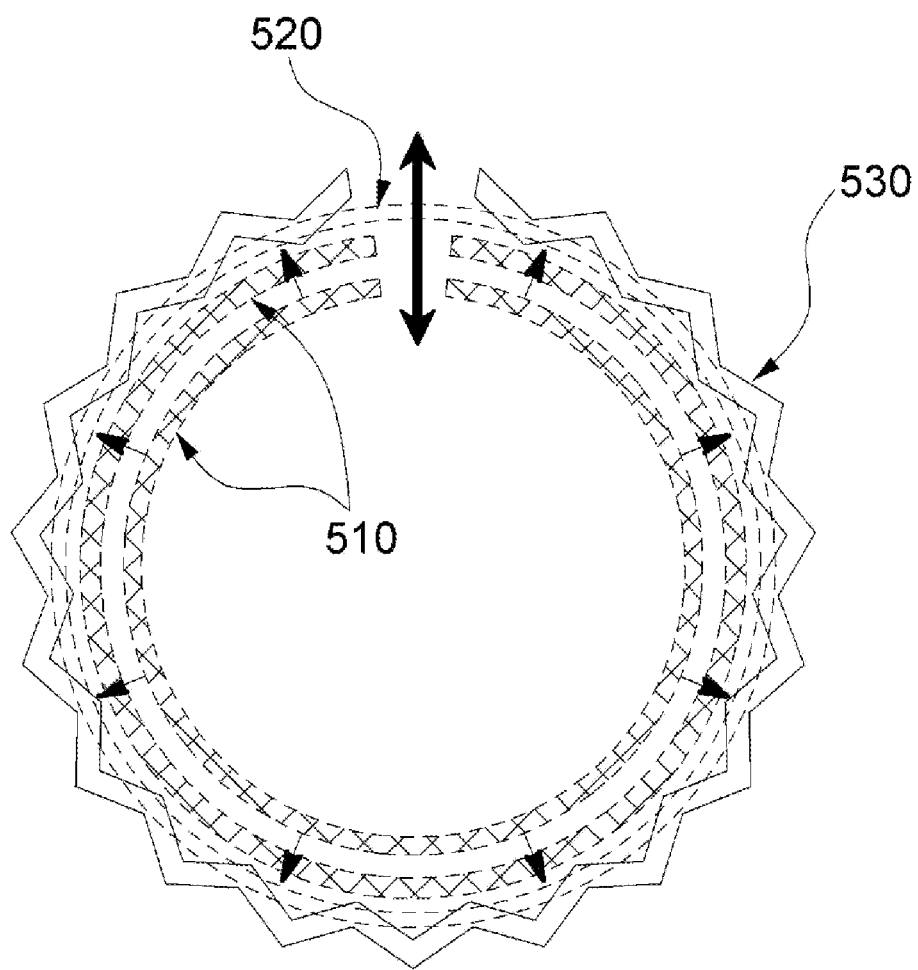

The grease, which is flowed into the receiving groove, flows into the absorbing part 500 that is disposed in each receiving groove. The grease heads toward the elastic storing part 510 through an opening part, which is referred as O in FIG. 16, of the foldable elastic part 530 of the absorbing part 500. The grease heading to the elastic storing part 510 enters into the elastic storing part 510 through the entering hole 512. The elastic storing part 510 is expanded by the inflow of the grease. The expanded elastic storing part 510, as illustrated in FIG. 19, pressurizes the foldable elastic part 530 the foldable elastic part 530, and thereby, the foldable elastic part 530 is unfolded and extended.

When a pressure of grease decreases, the foldable elastic part 530 returns to its original shape by an elastic force. The foldable elastic part 530 pressurizes and compresses the expanded elastic storing part 510, and thereby, the grease which fills inside the elastic storing part 510 is discharged through the entering hole 512. Then, the discharged grease is discharged to outside of the retainer 400 through a reversed process of the process described earlier.

While embodiments of the present invention have been described, the present invention is not limited to what has been particularly shown. It would be apparent that many more modifications and variations than mentioned above are possible by an ordinary person skilled in the art.

The scope of the present invention includes scopes of appended claims, modifications, and variations.

What is claimed is:

1. A foldable oil filter unit comprising:
   a cap CP receiving a filter F;
   a drain pin 100 disposed on a bottom side of the filter F; and
   a capturing part 200 disposed on a bottom side of the filter F and detachably, rotatably capturing the drain pin 100;
   wherein the capturing part 200 includes a rotational capturing part 210 that rotatably captures the drain pin 100 by a female and a male coupling;
   wherein the rotational capturing part 210 includes a pair of second brackets 211 that protrudes in a vertical direction from the bottom side of the filter F and that are spaced apart from each other and protruding parts 212 that respectively protrude, with a curvature, at inner lateral sides of the second brackets 211 that face each other;
   wherein a connecting part 120 includes a pair of first brackets 121 that each has a plate shape and grooved parts 122 that are formed, with a curvature, at outer lateral sides of the first brackets 121, that do not face each other, wherein the protruding parts 212 are inserted into the grooved parts 122, respectively.

2. The foldable oil filter unit according to claim 1, the drain pin 100 comprises a drain pin body 110 and a second through-hole 140 formed in the drain pin body 110,
   wherein a portion of the second though-hole 140 is exposed from a drain nipple N, and an inserting pin 300 is inserted into the second through-hole 140 from outside,
   wherein the inserting pin 300 has a bar shape, and a diameter of the inserting pin 300 becomes reduced as it comes closer to the drain pin 100,
   wherein when the inserting pin 300 is inserted to the second through-hole 140, the drain pin 100 moves downward and is separated.

3. The foldable oil filter unit according to claim 2,
   wherein the drain pin body 110 further comprises a first body 111 that the connecting part 120 is formed in; a second body 112 that the first body 111 is rotatably connected to; and a cross roller bearing CR that is disposed between the first body 111 and the second body 112;
   wherein the first body 111 comprises a first stem 111-1 that the connecting part 120 is formed in and that has a bar shape and a ledge 111-2 that is formed under the first stem 111-1 and a diameter thereof is bigger than that of the first stem 111-1,
   wherein the second body 112 comprises a second stem 112-1 that has a bar shape, a though-hole 112-3 that is formed at a top side of the second stem 112-1, and a receiving part 112-2 that is formed under the through-hole 112-3 and that receives the ledge 111-2.

4. The foldable oil filter unit according to claim 3,
   wherein the cross roller bearing CR is disposed between the first stem 111-1 and the through-hole 112-3, and the cross roller bearing CR comprises a retainer 400 that is disposed between a plurality of rollers CR1,
   wherein the retainer 400 comprises a first retainer body 410 and a second retainer body 410 that each has a plate shape,
   wherein a through-hole TH, a first center inflow hole 413, and a first lateral inflow hole 414 are formed at an outer lateral side of the first retainer body 410 that is an opposite side to the second retainer body 420, wherein the first center inflow hole 413 and the first lateral inflow hole 414 are formed under the through-hole TH, wherein the first center inflow hole 413 is formed in a bottom center in a width direction, wherein the first lateral inflow hole 414 is plural, and a plurality of first lateral inflow holes 414 are formed at both sides of the first center inflow hole 413 in a width direction,
   wherein a first top receiving groove 411 and a first bottom receiving groove 412 are formed at an inner lateral side of the first retainer body 410, that faces the second retainer body 420, wherein each of the first top receiving groove 411 and the first bottom receiving groove 412 is extended in a thickness direction, wherein the first top receiving groove 411 and the first bottom receiving groove 412 are spaced apart in a height direction,
   wherein a first center communicating hole 413-1 is formed under the first bottom receiving groove 412, and communicated with the first center inflow hole 413, wherein a first lateral communicating hole 414-1 is formed at both sides of the first center communicating hole 413-1 in a width direction, and communicated with the first lateral inflow hole 414, wherein a flow path FL is formed between the first center communicating hole 413-1 and the first bottom receiving groove 412; between the first lateral communicating hole 414-1 and the first bottom receiving groove 412.

5. The foldable oil filter unit according to claim 4,
   wherein a first center storing groove 415-1 is formed above the first top receiving groove 411, wherein a first lateral storing groove 416-1 is formed at both sides of the first top receiving groove 411 in a width direction, wherein a third storing groove 417 is formed between the first top receiving groove 411 and the first bottom receiving groove 412, wherein a flow path FL is formed between the first center storing groove 415-1 and the first top receiving groove 411; between the first lateral storing groove 416-1 and the first top receiving groove 411; and between the third storing groove 417 and the first lateral storing groove 416-1.

6. The foldable oil filter unit according to claim 5,
   wherein a through-hole TH, a second center inflow hole 423, and a second lateral inflow hole 424 are formed at an outer lateral side of the second retainer body 420 that is an opposite side to the first retainer body 410, wherein the second center inflow hole 423 and the second lateral inflow hole 424 are formed above the through-hole TH, wherein the second center inflow hole 423 is formed in a top center in a width direction, wherein the second lateral inflow hole 424 is plural, and a plurality of second lateral inflow holes 424 are formed at both sides of the second center inflow hole 423 in a width direction,
   wherein a second top receiving groove 421 and a second bottom receiving groove 422 are formed at an inner lateral side of the second retainer body 420 that faces the first retainer body 410, wherein each of the second top receiving groove 421 and the second bottom receiving groove 422 is extended in a thickness direction, and the second top receiving groove 421 and the second bottom receiving groove 422 are spaced apart in a height direction, wherein a second center communicating hole 423-1 is formed above the second top receiving groove 422, and communicated with the second center inflow hole 423, wherein a second lateral communicating hole 424-1 is formed at both sides of the second center communicating hole 423-1 in a width direction, and communicated with the second lateral inflow hole 424, wherein a flow path FL is formed between the second center communicating hole 423-1 and the second top receiving groove 421; between the second lateral communicating hole 424-1 and the second top receiving groove 422.

7. The foldable oil filter unit according to claim 6, wherein a third communicating hole 427 is formed above the second bottom receiving groove 422, wherein a second lateral storing groove 426-1 is formed at both sides of the second bottom receiving groove 422 in a width direction, wherein a second center storing groove 425-1 is formed under the second bottom receiving groove 426-1, wherein a flow path FL is formed between the second center storing groove 425-1 and the second bottom receiving groove 422; between the second lateral storing grove 426-1 and the second bottom receiving groove 422; and between the third storing groove 427 and the second bottom receiving groove 422.

8. The foldable oil filter unit according to claim 7, wherein grease flows through the through-hole TH of the first retainer body 410 and the through-hole TH of the second retainer body 420, wherein after the grease enters through the first center inflow hole 413 and the first lateral inflow hole 414 of the first retainer body 410, the grease flows the first center communicating hole 413-1 and the first lateral communicating hole 414-1; some of the grease flows into the first bottom receiving groove 412 through the flow path FL; and the rest of the grease flows into the second center storing groove 425-1 and the second lateral storing groove 426-1 of the second retainer body 420, and then flows into the second bottom receiving groove 422 through the flow path FL, wherein after the grease enters through the second center inflow hole 423 and the second lateral inflow hole 424 of the second retainer body 420, some of the grease flows the second center communicating hole 423-1 and the second lateral communicating hole 424-1; some of the grease flows into the second top receiving groove 421 through the flow path FL; and the rest of the grease flows into the first center storing groove 415-1 and the first lateral storing groove 416-1 of the first retainer body 410, and then flows into the first top receiving groove 411 through the flow path FL, wherein after the grease enter through a third inflow hole 425 of the second retainer body 420, some of the grease that is flowed into the third inflow hole 425, flows into the second top receiving groove 421 and the second bottom receiving groove 422 through the third communicating hole 427; the rest of the grease that is flowed into the third inflow hole 425, flows into the third storing groove 417 of the first retainer body 410, and then the grease in the third storing groove 417 flows into the first top receiving groove 411 and the first bottom receiving groove 412 through the flow path FL.

9. The foldable oil filter unit according to claim 8, the foldable oil filter unit further comprises a buffering part 500 disposed between the first retainer body 410 and the second retainer body 420, wherein the buffering part 500 is disposed in the first top receiving groove 411, the first bottom receiving groove 412, the second top receiving groove 421, and the second bottom receiving groove 422, respectively, wherein the buffering part 500 comprises an elastic storing part 510 that is elastically deformed by an inflow of grease, a supporting ring 520 that receives the elastic storing part 510 inside, and a foldable elastic part 530 that provides elastic force to the elastic storing part 510, wherein the elastic storing part 510 comprises an elastic storing part body 511 that is made of elastic materials and that has a hollow shape, and an entering hole 512 that is formed at a side of the elastic storing part body 511 and grease flows through.

10. The foldable oil filter unit according to claim 9, wherein the supporting ring 520 comprises a first supporting ring 521 and a second supporting ring 522 that are spaced apart from each other, wherein a connecting frame 523 having a bar shape, is disposed between the first and the second supporting ring 521, 522, wherein a plurality of connecting frames 523 are spaced apart from each other and formed along circumferences of the first and the second supporting ring 521, 522, wherein the foldable elastic part 530 is formed as a wave shape and disposed in a space between the connecting frames 523 along a circumferential direction of the supporting ring 521.

11. The foldable oil filter unit according to claim 10, wherein a portion of the foldable elastic part 530 along the circumferential direction is opened, wherein when the elastic storing part 510 is expanded, the elastic storing part 510 meets the foldable elastic part 530, and thereby, the foldable elastic part 530 is unfolded; wherein an elastic force of the foldable elastic part 530 pressurizes the elastic storing part 510 to return its original shape.

12. The foldable oil filter unit according to claim 11, the foldable oil filter unit further comprises a connecting part 540 disposed between the elastic storing parts 510, wherein the connecting part 540 comprises an elastic part 541 that has a ring shape and covers 542 that are disposed at both sides of the elastic part 541 and that are respectively fixed to the elastic storing part 510, wherein the elastic part 541 comprises an elastic circular arc part 5411 that has a circular arc shape in a cross section and an extending part 5412 that is extended from both sides of the elastic circular arc part 5411 in a horizontal direction, wherein the covers 542 comprises a first cover 542A that is disposed at one side of the elastic part 541 and a second cover 542B that is disposed at the other side of the elastic part 541 and has a symmetrical shape to the first cover 542A, wherein the cover 542 has a hollow shape and is disposed inside the extending part 5412, wherein the cover 542 comprises a cover body 5421 that is opened toward the elastic part 541 and an interlocking bump 5422 that protrudes from the cover body 5421.

13. The foldable oil filter unit according to claim 12, wherein a first opening part 5413 is formed along a circumferential direction in the extending part 5412 that is disposed at one side of the elastic part 541, and the interlocking bump 5422 is inserted into the first opening part 5413, wherein a second opening part 5414 is formed along a circumferential direction in the extending part 5412 that is disposed at the other side of the elastic part 541, and the interlocking bump 5422 is inserted into the second opening part 5414.

14. The foldable oil filter unit according to claim 1,
wherein the capturing part 200 includes a paper 220 that is connected to the bottom side of the filter F by ultrasonic welding,
wherein the drain pin 100 is connected to the paper 220.

15. The foldable oil filter unit according to claim 1,
wherein the capturing part 200 includes an adhesive 230 that is connected to the bottom side of the filter F by ultrasonic welding,
wherein the drain pin 100 is connected to the adhesive 230.

\* \* \* \* \*